United States Patent
Catthoor et al.

(10) Patent No.: US 6,223,274 B1
(45) Date of Patent: Apr. 24, 2001

(54) POWER-AND SPEED-EFFICIENT DATA STORAGE/TRANSFER ARCHITECTURE MODELS AND DESIGN METHODOLOGIES FOR PROGRAMMABLE OR REUSABLE MULTI-MEDIA PROCESSORS

(75) Inventors: Francky Catthoor, Temse; Miguel Miranda, Heverlee; Stefan Janssens, Lennik; Hugo De Man, Kessel-Lo, all of (BE)

(73) Assignee: Interuniversitair Micro-Elecktronica Centrum (IMEC), Leuven (BE)

( * ) Notice: Subject to any disclaimer, the term of this patent is extended or adjusted under 35 U.S.C. 154(b) by 0 days.

(21) Appl. No.: 09/196,645

(22) Filed: Nov. 19, 1998

Related U.S. Application Data

(60) Provisional application No. 60/066,163, filed on Nov. 19, 1997.

(51) Int. Cl.[7] .................................................. G06F 9/44
(52) U.S. Cl. .................................. 712/34; 712/40; 717/4; 709/108
(58) Field of Search ............................... 712/34, 35, 36, 712/40, 43; 709/108; 717/4

(56) References Cited

U.S. PATENT DOCUMENTS

| | | | |
|---|---|---|---|
| 5,732,275 | * 3/1998 | Kullick | 717/11 |
| 5,784,611 | * 7/1998 | Thantrakul | 713/1 |
| 5,959,689 | * 9/1999 | DeLange | 348/571 |
| 5,974,454 | * 10/1999 | Apfel | 709/221 |
| 6,009,507 | * 12/1999 | Brooks | 712/28 |
| 6,061,711 | * 5/2000 | Song | 709/108 |
| 6,141,675 | * 10/2000 | Slavenburg | 708/706 |

OTHER PUBLICATIONS

Brodersen, *Proc. IEEE Int. Solid–State Circ. Conf.*, San Francisco, CA, pp. 32–36, Feb. 1997, 9 pages "The Network Computer and its Future."

Catthoor, et al., *IEEE Workshop on VLSI Signal Processing*, La Jolla, CA, pp. 178–187, Oct. 1994, "Global Communication and Memory Optimizing Transformation for Low Power Signal Processing Systems."

Chatterjee, *Proc. IEEE Int. Solid State Circ. Conf.*, San Francisco, CA, pp. 26–30, Feb. 1995, "Gigachips: Deliver Affordable Digital Multimedia for Work and Play Via Broadband Network and Set–Top Box."

(List continued on next page.)

*Primary Examiner*—Eric Coleman
(74) *Attorney, Agent, or Firm*—Knobbe, Martens, Olson & bear, LLP

(57) ABSTRACT

A programmable processing engine and a method of operating the same is described, the processing engine including a customized processor, a flexible processor and a data store commonly sharable between the two processors. The customized processor normally executes a sequence of a plurality of pre-customized routines, usually for which it has been optimized. To provide some flexibility for design changes and optimizations, a controller for monitoring the customized processor during execution of routines is provided to select one of a set of pre-customized processing interruption points and for switching context from the customized processor to the flexible processor at the interruption point. The customized processor can then be switched off and the flexible processor carries out a modified routine. By using sharable a data store, the context switch can be chosen at a time when all relevant data is in the sharable data store. This means that the flexible processor can pick up the modified processing cleanly. After the modified processing the flexible processor writes back new data into the data store and the customized processor can continue processing either where it left off or may skip a certain number of cycles as instructed by the flexible processor, before beginning processing of the new data.

30 Claims, 23 Drawing Sheets

OTHER PUBLICATIONS

Cupak, et al., *Proc. Wsh. on System Design Automation*, Dresden, Germany, 8 pages, Mar. 1998, "Functional Validation of System–Level Loop Transformations for Power Efficient Caching."

Danckaert, et al., Proc. IEEE Intnl. Workshop on Hardware/ Software Co–design, Braunschweig, Germany, pp. 55–59, Mar. 1997. "System–Level Memory Management for Weakly Parallel Image Processing."

Danckaert, et al., *Proc. IEEE Intnl. Workshop on Hardware/ Software Co–Design*, Braunschweig, Germany, pp. 55–59, Mar. 1997, "System Level Memory Optimization for Hardware–Software Co–Design."

Gonzalez and Horowitz, *IEEE Journal of Solid–State Circuits*, 31(9): 1277–1284, Sep. 1996, "Engergy Dissipation in General Purpose Microprocessors."

Halfhill and Montgomery, *Byte*, pp. 171–178, Nov. 1995, "Chip Fashion: Multimedia Chips will Dominate the Technical Talk at This Year's Microprocessor Forum."

Hennessy and Patterson, eds., Morgan Kaufmann Publishers, San Mateo, California, *Contents Only*, Copyright 1994, Computer Organization and Design, The Hardware/Software Interface.

Kulkarni, et al., *Intnl. Parallel Proc. Symp.* (*IPPS*), Orlando, Florida, pp. 923–932, Apr. 1997, "Hardware Cache Optimization for Parallel Multimedia Applications."

Kulkarni, et al., *Intnl. Parallel Proc. Symp.* (*IPPS*), pp. 292–297, Mar. 30, 1998, "Code Transformations for Low Power Caching in Embedded Multimedia Processors."

Lippens, et al., *Proc. IEEE Int. Conf. Comp. Aided Design*, Santa Clara, CA, pp. 728–735, Nov. 1993, "Allocation of Multiport Memories for Hierarchical Data Streams."

Meng, et al., *Proc. of the IEEE*, 83(4): 659–680, Apr. 1995, "Portable Video–on–Demand in Wireless Communication."

Moolenaar, et al., *Proc. IEEE Workshop on Signal Processing Systems* (*SIPS*), Leicester, UK, 10 pages, Nov. 1997, "System–Level Power Exploration for MPEG–2 Decoder on Embedded Cores: A Systematic Approach."

Nachtergaele, et al., *IEEE. Workshop on VLSI Signal Processing*, Monterey, CA, 6 pages, Oct. 1995, "Low Power Storage Exporation of H.263 Video Decoder."

Nachtergaele, et al., *Proc. Intnl. Workshop on Memory Technology, Design & Testing*, San Jose, CA, pp. 82–87, Aug. 1995, "Optimization of Memory Organization and Hierarchy for Decreased Size and Power in Video and Image Processing Systems."

Pirsch, et al., *Procedings of the IEEE*, 83(2): 220–246, Feb. 1995, "VLSI Architectures for Video Compression—A Survey."

Tiwari, et al., *Proc. IEEE Int. Conf. Comp. Aided Design*, Santa Clara, CA, pp. 384–390, Nov. 1994, "Power Analysis of Embedded Software: A first Step Towards Software Power Minimization."

Verbauwhede, et al., *Proc. VLSI'89 Int. Conf. on VLSI*, Munich, Germany, pp. 209–218, Aug. 1989, "Background Memory Synthesis for Algebraic Algorithms on Multi–Processor DSP Chips."

Wuytak, et al., *Proc. IEEE Intnl. Symp. on Low Power Design*, Monterey, CA, pp. 359–364, Aug. 1996, "Power Exploration for Data Dominated Video Applications."

\* cited by examiner

POWER- AND SPEED-EFFICIENT DATA STORAGE/TRANSFER ARCHITECTURE MODELS AND DESIGN METHODOLOGIES FOR PROGRAMMABLE OR REUSABLE MULTI-MEDIA PROCESSORS

RELATED APPLICATIONS

This application claims priority to provisional application Ser. No. 60/066,163, filed Nov. 19, 19997, entitled POWER AND SPEED-EFFICIENT DATA STORAGE/TRANSFER ARCHITECTURE MODELS AND DESIGN METHODOLOGIES FOR PROGRAMMABLE OR REUSABLE MULTI-MEDIA PROCESSORS. Applicant hereby claims benefit under 35 U.S.C. § 119(e).

BACKGROUND OF THE INVENTION

1. Field of the Invention

The present invention relates to processors and processor organization for the execution of data-dominated programs and in particular to provide a combination of the flexibility of software processors and the speed and cost efficiency of dedicated hardware processors. In particular, the present invention relates to flexibly reusable customized processors and methods of using the same.

2. Description of the Related Technology

A representative application for data-dominated processing is (MPEG based) video compression. Many custom hardware architectures for motion estimation and other MPEG subsystems have been proposed. Power management and reduction is becoming a major issue for such applications. Two examples of MPEG2 custom processors using comparable CMOS technologies are known and exhibit the following characteristics:

SGS: 4 chip set, 20 W@27 MHz, flexible centralized bus/memory organization, 64 Mbit external RAM.
Mitsubishi: 3 chip set, 8.5 W@8 MHz, heavily customized, distributed organization, 44 Mbit external DRAM.

Both have a widely differing data transfer and storage organization. As a result, the flexibility and ease of design of the shared bus system is traded-off against a higher power budget. A relatively general model (template) abstracting mainly the data transfer and storage architecture for such HW solutions is illustrated in FIG. 1. The main memory architecture is separate from the processing capacity (data processors DP) which includes a custom memory management unit (MMU), and some local buffers to control the flow of data between the main processing capacity and the memory. The pros and cons of this approach are:

1 −: design is difficult (MMU, control, interfaces); design exploration support is currently very limited at system level (only "integration" tackled);
2. −−: application-specific so cannot be changed after the chip is processed;
3. −: power still too large due to rigid memory hierarchy and central bus architecture
4. +: area acceptable due to logic synthesis and manually written structural VHDL
5. ++: speed very good except transfer overhead for data-dominated systems Although the power bottle-neck for custom processors can be alleviated to a significant extent by a combination of global and aggressive system-level data-flow and loop transformations combined with a heavily partitioned custom memory organization without an area or speed penalty the same is not true for the current generation of programmable processor solutions.

Many of such architectures have been proposed for video and image processing. Power management and power reduction for these processors is hardly tackled in literature but it is recognized as a growing problem in the industry (at least at the "customer" side). Several recent commercial multi-media oriented processors have been marketed or announced: TI-C80 and recently C60, Philips-TriMedia, Chromatic-Mpact, Nvidia NV1, NEC PIP-RAM. Several other Super-scalar/VLIW processors have been announced with an extended instruction-set for multi-media applications: Intel (MMX), SGI/MPS (MDMX), HP (MAX), DEC (MVI), Sun (VVIS), AMD (MMX), IBM (Java). Also a few more dedicated domain-specific ASIP processors have been proposed, such as the MIPS MPEG2 engine which includes a multi-RISC, several memories and a programmable network.

A relatively general abstraction of such processors is illustrated in FIG. 2. The main memory is accessed via data caches with a separate memory and instruction cache for the program instructions. The pros and cons of this approach are:

1 ++: reasonable design time for application engineer. Programming relatively easy for the processor data-paths (arithmetic operations). The transfer and storage organization is however almost always left to hardware (cache controllers and MMU) to reduce the mapping complexity for the programmer/compiler.
2 +: full flexibility in applications though the speed bottle-neck remains an issue in many cases.
3 −−: large power due to expensive data transfers (long "distances" and fixed memory hierarchy) of which many are not really necessary. The latter are added e.g. due to the non-optimal run-time cache control which typically involves overhead in duplicate data transfers from main memory for reused data with longer life-times, or due to the speculative execution in many processors as decided in the branch prediction unit.
4 −−: most area of chip/board is taken up by memories and busses. Also addressing and control complexity are high.
5 −−: speed still too low for demanding applications so parallel processors have to be introduced. But parallel processors are very difficult to program efficiently due to data communication.

In order to introduce parallel processing (see FIG. 3), the current approach is almost solely focused on the arithmetic operations: several parallel data processors operate on a shared cache (multi-scalar) or several "full" processors operate on a shared main memory. The reason to select such a "single virtual address space" option for the main memory is only the simplicity of compiling the applications on the parallel architecture. This choice leads however to several drawbacks, e.g. the power overhead is even larger due to the physical memory organization with large memories and many global connections. Area is also further influenced negatively because of the complexity of the internal memory organization to have everything shared. This happens both due to the bus communication overhead needed to solve the performance bottle-neck, and due to the need for duplicating globally allocated data also in the local (cache) memories for the processors. The speed bottle-neck is only partly solved by the introduced parallelism because obtaining the required data is usually not feasible in parallel with the arithmetic operations due to the limited I/O and memory band-width. As a result, idle cycles are introduced in the data-paths (NOPs).

Much work has been published in the past on cache coherence protocols, also for parallel processors. In the parallel compiler domain however, mostly load balancing and parallelisation issues for the arithmetic operations have been tackled because the general approach relies on the hardware caching mechanism. A few have addressed the data localization issue to obtain a better cache usage. The conventional programmable architectures and conventional (parallel) compilers will lead to major heat dissipation problems.

If the state of the art on custom (HW) and programmable instruction-set (SW) processors for data-dominated multi-media applications is reviewed it becomes clear that much of the architecture components are intended to solve the data transfer and storage issues. In both HW and SW, the main power (and largely also area) cost is situated in the memory units and the (bus) communication hardware. On the HW side, several system level memory management related methodologies are being proposed which promise very large savings on power and also on area while still meeting the real-time constraints. Unfortunately, on the SW side these methodologies are not applicable as such and even when modified, the programmability overhead in the data transfer and storage architecture will still lead to a (large) penalty paid in power consumption compared to the HW solution. They exhibit different characteristics in terms of power and speed efficiency versus processor architecture and design time impact.

The top-level view of a typical heterogeneous system architecture including both custom hardware (accelerator data path, dedicated processor and glue logic) and programmable processors (DSP and RISC cores, master control) in a target application domain is illustrated in FIG. 4. Architecture experiments have shown that 50–80% of the area cost in (application-specific) architectures for real-time multi-dimensional signal processing is due to memory units, i.e. single or multi-port RAMs, pointer-addressed memories, and register files. The power cost both for custom HW and for SW processors is even more heavily dominated by storage and transfers for complex data types. Hence, the organization of the global data transfer and storage, together with the related algorithmic transformations, form the dominating factors in the system-level architecture design decisions. For such applications, the data transfer and storage architecture for SW processors, i.e. the available memory units and the (bus) communication hardware between them together with their use for a given application is power inefficient.

AIM OF THE INVENTION

It is an object of the present invention to alleviate the problems with conventional programmable (parallel) processors and to provide a system-on-a-chip solution, with a flexible mix of hardware (HW) and software (SW) processors.

It is a further object of the present invention to implement a (much) larger part of the application in power/area/time efficient HW, while largely maintaining the flexibility of a traditional SW implementation.

It is still a further object of the present invention to make a reusable customized processor which may be reused with modified applications which differ from the application originally intended for the processor but without incurring the cost overhead of a fully programmable solution.

REFERENCES

Technical literature which may be useful in understanding the present invention may be: R. W. Brodersen, "The network Computer and its Future," Proc. IEEE Int. Solid-State Circ. Conf., San Francisco Calif., pp.32–36, February 1997; F. Catthoor, F. Franssen, S. Wuytack, L. Nachtergaele, H. De Man, "Global communication and memory optimizing transformations for low power signal processing systems", IEEE workshop on VLSI signal processing, La Jolla Calif., October 1994; P. Chatterjee, "Gigachips: deliver affordable digital multi-media for work and play via broadband network and set-top box", Proc. IEEE Int. Solid-State Circ. Conf., San Francisco Calif., pp.26–30, February 1995; K. Danckaert, F. Catthoor, H. De Man, "System level memory optimization for hardware-software co-design", Proc. IEEE Intnl. Workshop on Hardware/Software Co-design, Braunschweig, Germany, pp.55–59, March 1997; R. Gonzales, M. Horowitz, "Energy dissipation in general-purpose microprocessors", IEEE J. Solid-state Circ., Vol.SC-31, No.9, pp.1277–1283, September 1996; T. Halfhill, J. Montgomery, "Chip fashion: multi-media chips", Byte Magazine, pp.171–178, November 1995; C. Kulkarni, F. Catthoor, H. De Man, "Cache Optimization for Multimedia Compilation on Embedded Processors for Low Power", submitted to Intnl. Parallel Proc. Symp.(IPPS), Orlanda Fla., April 1997; P. Lippens, J. van Meerbergen, W. Verhaegh, A. van der Werf, "Allocation of multiport memories for hierarchical data streams", Proc. IEEE Int. Conf. Comp. Aided Design, Santa Clara Calif., November 1993; T. H. Meng, B. Gordon, E. Tsern, A. Hung, "Portable video-on-demand in wireless communication", special issue on "Low power electronics" Proc. of the IEEE, Vol.83, No.4, pp.659–680, April 1995; D. Moolenaar, L. Nachtergaele, F. Catthoor, H. De Man, "System-level power exploration for MPEG-2 decoder on embedded cores: a systematic approach", Proc. IEEE Wsh. on Signal Processing Systems (SIPS), Leicester, UK, November 1997; L. Nachtergaele, F. Catthoor, F. Balasa, F. Franssen, E. De Greef, H. Samsom, H. De Man, "Optimisation of memory organisation and hierarchy for decreased size and power in video and image processing systems", Proc. Intnl. Workshop on Memory Technology, Design and Testing, San Jose Calif., pp.82–87, August 1995; L. Nachtergaele, F. Catthoor, B. Kapoor, D. Moolenaar, S. Janssens, "Low power storage exploration for H.263 video decoder", IEEE workshop on VLSI signal processing, Monterey Calif., October 1996; D. A. Patterson, and J. L. Hennessy, "Computer Organisation and Design: the Hardware/Software Interface", Morgan Kaufmann Publishers, NY, 1994; P. Pirsch, N. Demassieux, W. Gehrke, "VLSI architectures for video compression—a survey", Proc. of the IEEE, invited paper, Vol.83, No.2, pp.220–246, February 1995; V .Tiwari, S. Malik, A. Wolfe, "Power analysis of embedded software: a first step towards software power minimization", Proc. IEEE Int. Conf. Comp. Aided Design, Santa Clara Calif., pp.384–390, November 1994; I. Verbauwhede, F. Catthoor, J. Vandewalle, H. De Man, "Background memory management for the synthesis of algebraic algorithms on multi-processor DSP chips", Proc. VLSI'89, Int. Conf. on VLSI, Munich, Germany, pp.209–218, August 1989; S. Wuytack, F. Catthoor, L. Nachtergaele, H. De Man, "Power Exploration for Data Dominated Video Applications", Proc. IEEE Intnl. Symp. on Low Power Design, Monterey, pp.359–364, August 1996.

SUMMARY OF THE INVENTION

The present invention includes a programmable processing engine, the processing engine including a customized processor, a flexible processor and a data store commonly sharable between the two processors, the customized processor normally executing a sequence of a plurality of pre-customized routines, comprising: a controller for monitoring the customized processor during execution of a first code portion to flexibly select one of a set of pre-customized processing interruption points in a first routine and for switching context from the customized processor to the flexible processor at the selected interruption point.

The present invention also includes a method of operating a programmable processing engine, the processing engine including a customized processor, a flexible processor and a data store commonly sharable between the two processors, the customized processor normally executing a sequence of a plurality of pre-customized routines, comprising the steps of: monitoring the customized processor during execution of a first code portion to flexibly select one of a set of pre-customised processing interruption points in a first routine; and switching context from the customized processor to the flexible processor at the selected interruption point. The method preferably includes as a next step executing a second code portion on said flexible processor using at least a part of first data left in the data store by the execution of the first code portion on the customized processor.

The present invention also includes a processor architecture comprising a hierarchy of cache memories, wherein the cache memories are flexibly configurable at run time. This processor architecture can be advantageously used in the processing method and apparatus mentioned above. In this processor architecture, the flexibly configurable cache memories may include flexible bypasses over a selectable combination of cache levels of the hierarchy. In this processor architecture, the flexibly configurable cache memories may also include means for allowing signals to reside in a selectable one of the cache levels of the hierarchy for more than one cycle. In this processor architecture, the flexibly configurable cache memories may also include means for allowing different cache levels of the cache memory hierarchy to be merged in a single memory such that the size of each cache level is selectable therefrom. In this processor architecture, the flexibly configurable cache memories may also include means for dividing the cache into banks and means for selectably combining the banks into selectably accessible cache partitions. In this processor architecture, the flexibly configurable cache memories may also include means for allowing selection of the degree of associativity for any cache level.

The present invention will now be described with reference to the following drawings.

DETAILED DESCRIPTION OF THE INVENTION AND PREFERRED EMBODIMENTS

Figure 1:
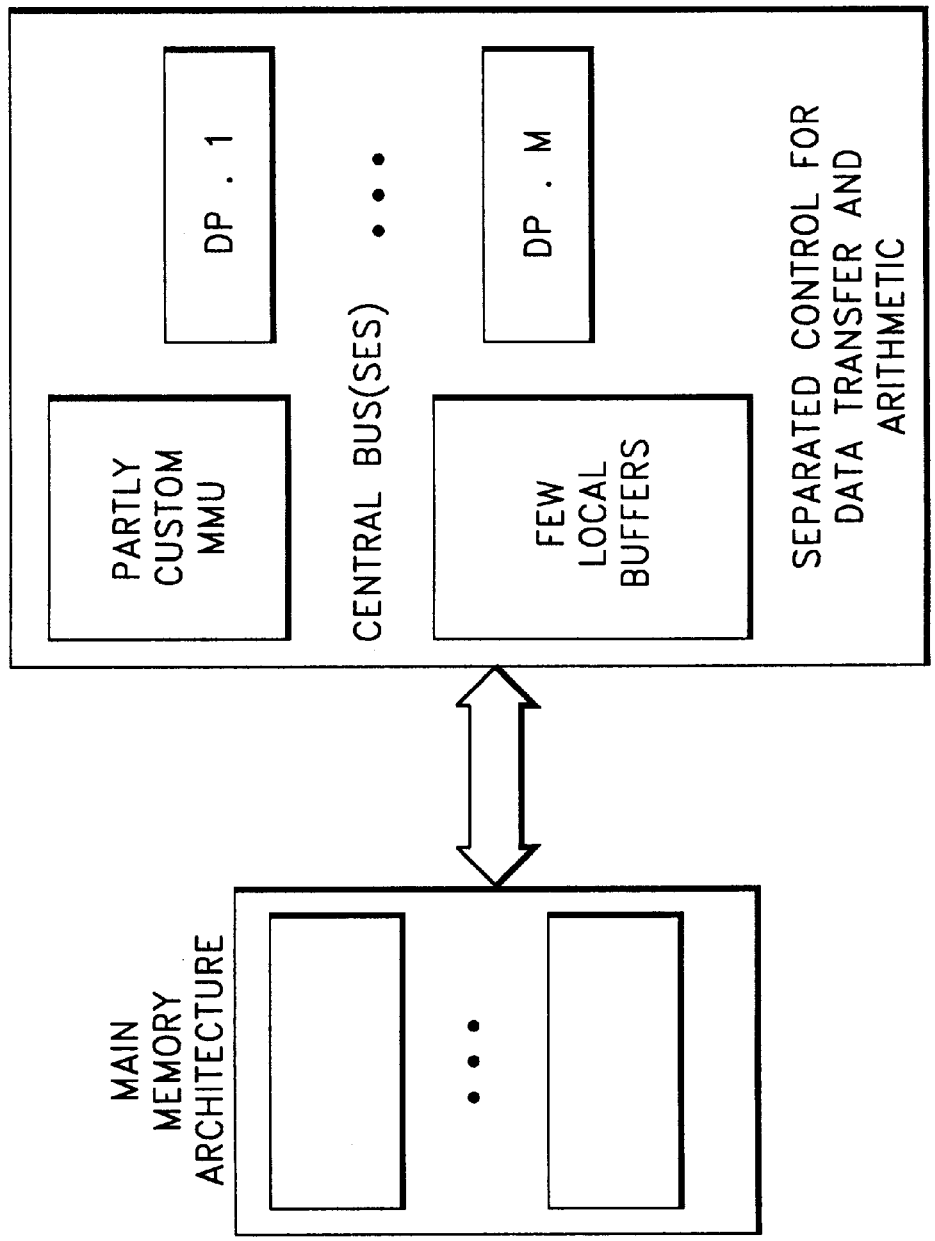
FIG. 1 is a schematic representation of a conventional hardware architecture model.
Figure 2:
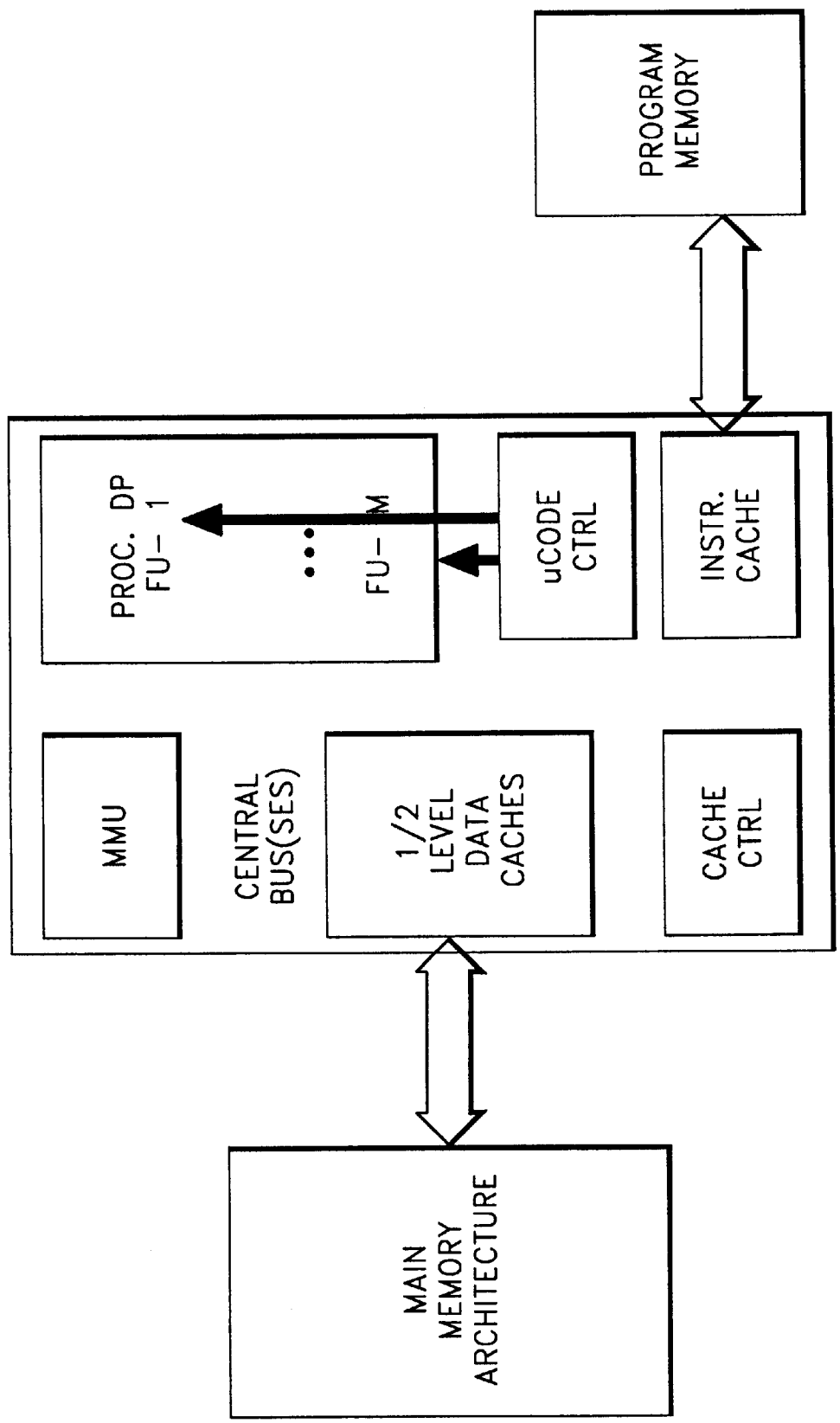
FIG. 2 is a schematic representation of a conventional software architecture model.
Figure 3:
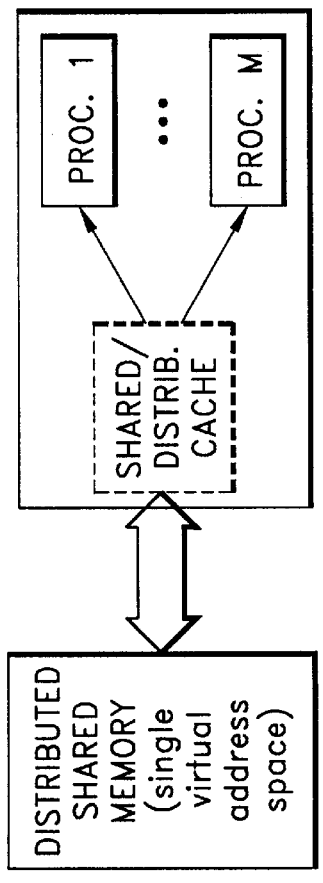
FIG. 3 is a schematic representation of a conventional architecture model: parallel SW
Figure 4:
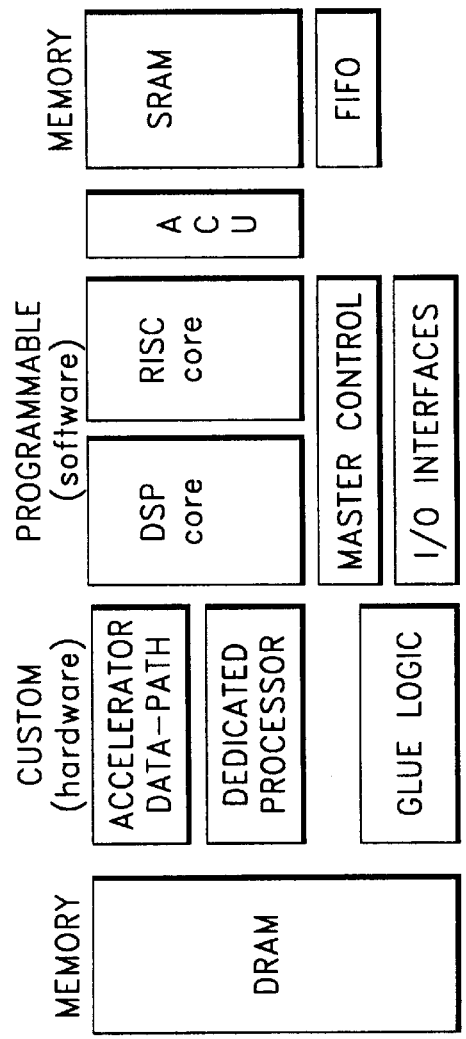
FIG. 4 shows a typical heterogeneous system-on-a-chip architecture for multi-media applications, with custom hardware (application-specific accelerator data-paths and logic), programmable processor (DSP core and controller), and a cost-dominant distributed memory organization.

The present invention includes architectural and design methodology useful for the inclusion of both custom HW and flexible SW units together on a single-chip system and how to organize the control to allow a considerable flexibility and reprogrammability without increasing power characteristics of the design. This comes as a (much) more cost effective alternative to conventional solutions, where, for instance, fully programmable SW components are applied for the purpose of flexibility.

The target domain of the present invention includes all real-time data-dominated applications, which deal with large amounts of complex data types. This happens both in real-time multi-dimensional signal processing (RMSP) applications such as video and image processing (which handle indexed array signals, usually in the context of loops), and in sophisticated communication network protocols (which handle large sets of records organized in tables and pointers). Both classes of applications contain many important applications, e.g. video coding, medical image archival, multi-media terminals, artificial vision, xDSL modems, ATM networks, and LAN/WAN technology. Experiments have clearly demonstrated the data-dominated nature of crucial modules in these applications.

Several assumptions and facts will be used as basis for the embodiments of the present invention. The power consumption of processors is rising sharply and moving rapidly into storage (data and program memory) and partly also transfers (communication and I/O), as already demonstrated above. Using a simple hardware instruction cache, the microcode contribution in the power budget can be kept negligible for multi-media applications because these mainly consist of heavily nested loops with relatively large bounds. So most of the time, the link to the main program memory can be powered down. Then, it is assumed that the cache is distributed and the different parts should be localized as close as possible to the places on the chip where the decoded control bits have to be used in the processor, i.e. close to the functional unit (FU) to which the involved instruction field applies. Otherwise, the distribution of a wide control bus (especially for very large instruction width processors) will still absorb too much on-chip power. Care should be exercised here to avoid unnecessary duplicate decoding overhead locally at the functional units (FU), so a good clustering of these units sharing a local cache and its corresponding decoder should be aimed at. Modern off-chip (S)DRAMs already offer low power solutions but this is only feasible when they operate in burst mode with large data widths. This is not directly compatible with the actual use of the data in the processor data-paths so a hierarchical and typically power-hungry intermediate memory organization is needed to match the central DRAM to the data ordering and bandwidth requirements of the processor data-paths. The decrease of the power consumption in fast random-access memories is saturating, because most circuit and technology level tricks have already been applied and the remaining basic limitation lies in transporting the data and the control (like addresses and internal signals) over large on-chip distances.

Based on the observation that the power consumed by SW solutions and also the speed performance are significantly worse than the HW counterpart (2 to 3 orders of magnitude are experienced in practice in differences in the product of energy use and delays), some individual key aspects of the present invention may be summarized as one or more of the following:

Introduce a synchronization protocol between a custom HW processor (CP) and a programmable instruction-set processor (IP) to support a very speed and power efficient context switch between the two sides (first embodiment). This allows some flexibility to change the operation after final design, e.g. performance of all tasks is made initially on the CP and then the necessary modified routines are moved to the IP (for the modified operation) on condition that the data for these routines are available in the shared address space of the IP and CP.

And/or provide several alternatives for matching the protocol towards different existing SW processor architectures including instruction sets (variants of the first embodiment).

And/or enlarge the shared address space of IP and CP in a power and speed efficient way by using a special switch network (second embodiment). This reduces the granularity at which context switches can occur and hence can significantly reduce the overhead of moving operations to the IP.

And/or provide a design methodology oriented towards data-dominated applications for deciding on which trade-offs to make between the many variants in the co-operation between IP and CP.

And/or introduce a more domain-specific memory and communication organization on the IP side (third embodiment). As a result a heavily distributed and partly customized memory/bus/address architecture is included which takes care of the data transfer and storage for the data-dominated routines in a more power and speed effective way.

And/or allow more flexible reusable components by adding a small IP processor co-operating in the way described above with a customized processor. The behavior of the reusable component can still be partly modified when embedding it, without sacrificing power or speed efficiency in a significant way (fourth embodiment).

Figure 5:
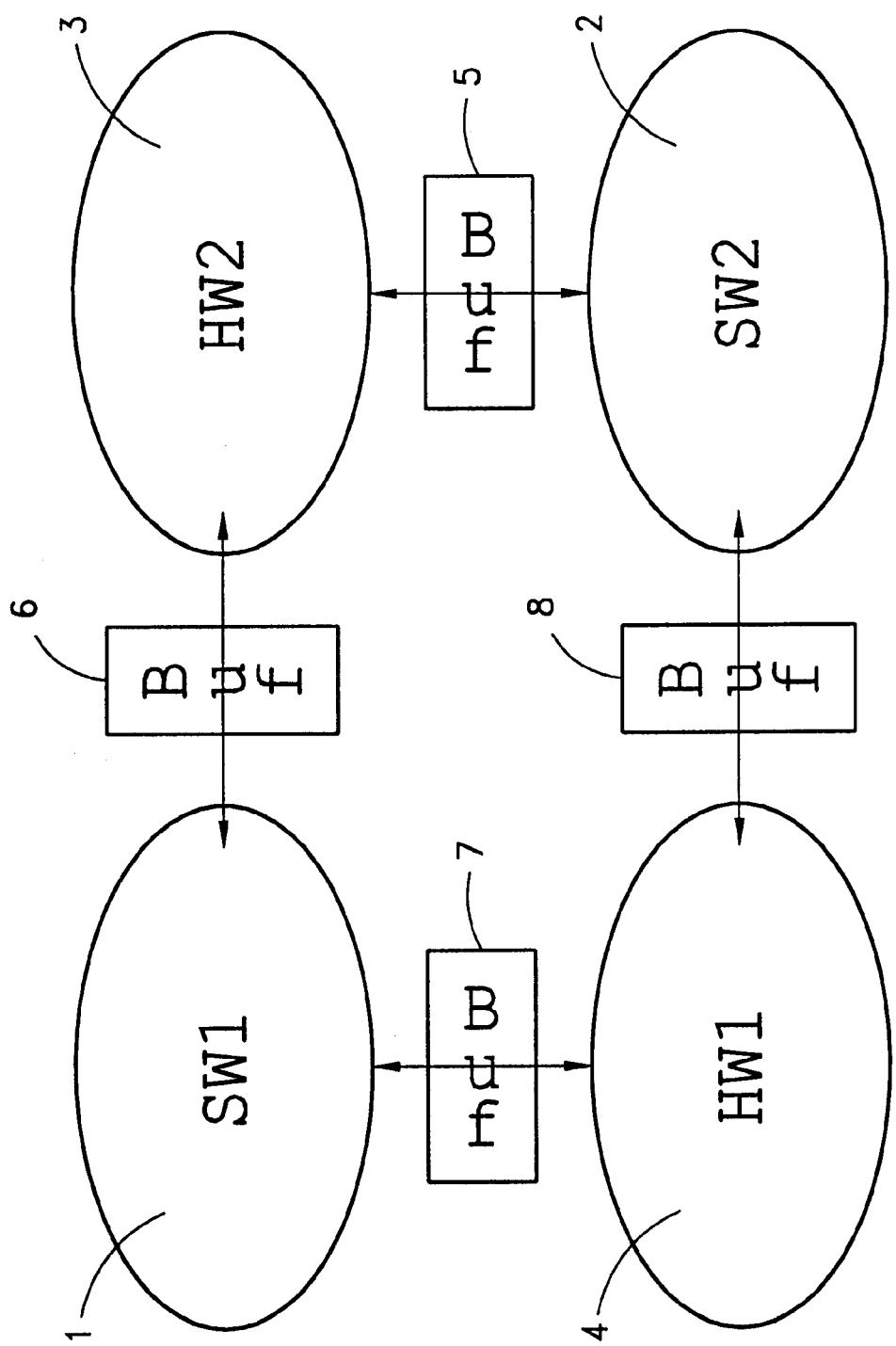
FIG. 5 shows co-operation of SW and HW partitions with intermediate buffers.

The conventional configuration for co-operation between algorithm parts assigned to SW and HW processors is shown in FIG. 5. The partitioning between the SW processors 1, 2 and hardware processors 3, 4 is usually not done perfectly so that typically, buffers 5–8 are situated on the boundaries between SW and HW processors 1–4 to compensate for the data sequence mismatch around these interfaces. System-level memory management (SLMM) may be used to help design such a split between HW and SW processors. SLMM may impose some constraints on the exact locations in the global algorithm (e.g. represented by a control/data flow-graph or CDFG), regarding the cuts which can be made between SW and HW. Code transformations, memory allocation and cache memory optimization may be advantageously combined with the present invention in order to provide an optimal HW/SW partitioning and HW and/or SW processor memory design, see for example US patents having the Ser. No. 08/827,883, now U.S. Pat. No. 6,064,819, "Control flow and memory management and optimisation", and Ser. No. 08/649,903, "Background memory allocation for multi-dimensional signal processing", U.S. Pat. No. 5,742,814, the co-pending European patent application EP 867 808, "Method and apparatus for size optimisation of storage units" and the articles "Code transformations for low power caching on embedded processors", Kulkarni et al., Int. Parallel Proc. Symposium (IPPS), Orlando, Fla., pp 292–297, April 1998; "Efficient functional validation of system loop transformations for multi-media applications", Cupak et al., Proc. Electronic Circuits and system conference, Bratislava, Slovakia, pp 39–43, September 1997; "Functional validation of system level loop transformations for power efficient caching", Cupak et al. Proc. Wsh. on System Design Automation, Dresden Germany, March, 1998.

First Embodiment

In accordance with a first embodiment of the present invention a processor architecture solution is proposed to obtain more power-efficient flexible processors, e.g. on a programmable processor or a reconfigurable logic circuit. The processor architecture impact is very low and involves only the availability of some instructions in the processor instruction set to allow a fine-grain synchronization and data exchange with the custom hardware side. In general, reuse of existing processor cores which are modified as little as possible internally, while still obtaining the desired power and speed advantages is an advantage of this embodiment. In order to allow a partial saving of power and to remove part of the data transfer related (performance/power) bottleneck, one or more customized processors 21 (CP) can be combined with one or more on-chip processor core(s) 22 (instruction set processor, IP), leading to the solution shown schematically in FIG. 6. It assumes that both IP 22 and CP 21 have a selective power-up/down capability. This solution can be made reprogrammable at run-time by installing a special interaction protocol between the SW (IP, 22) and HW parts (CP, 21) and by appropriately distributing the tasks over the instruction-set processor(s) (IP, 22) and the custom processor(s) (CP, 21), depending on the given application requirements. This situation is quite different from the recently introduced conventional HW "slave" processors co-operating with SW master processors or the MMX type SIMD based functional units embedded in conventional RISC processors. Note also that the initial CP architecture (FIG. 6) is fully optimized towards the given application (no compromises have to be made) so typically one to two orders of magnitude gain can be expected in terms of the power and area efficiency of this solution compared to an IP mapping solution (even when fully optimizing the latter).

Figure 6:
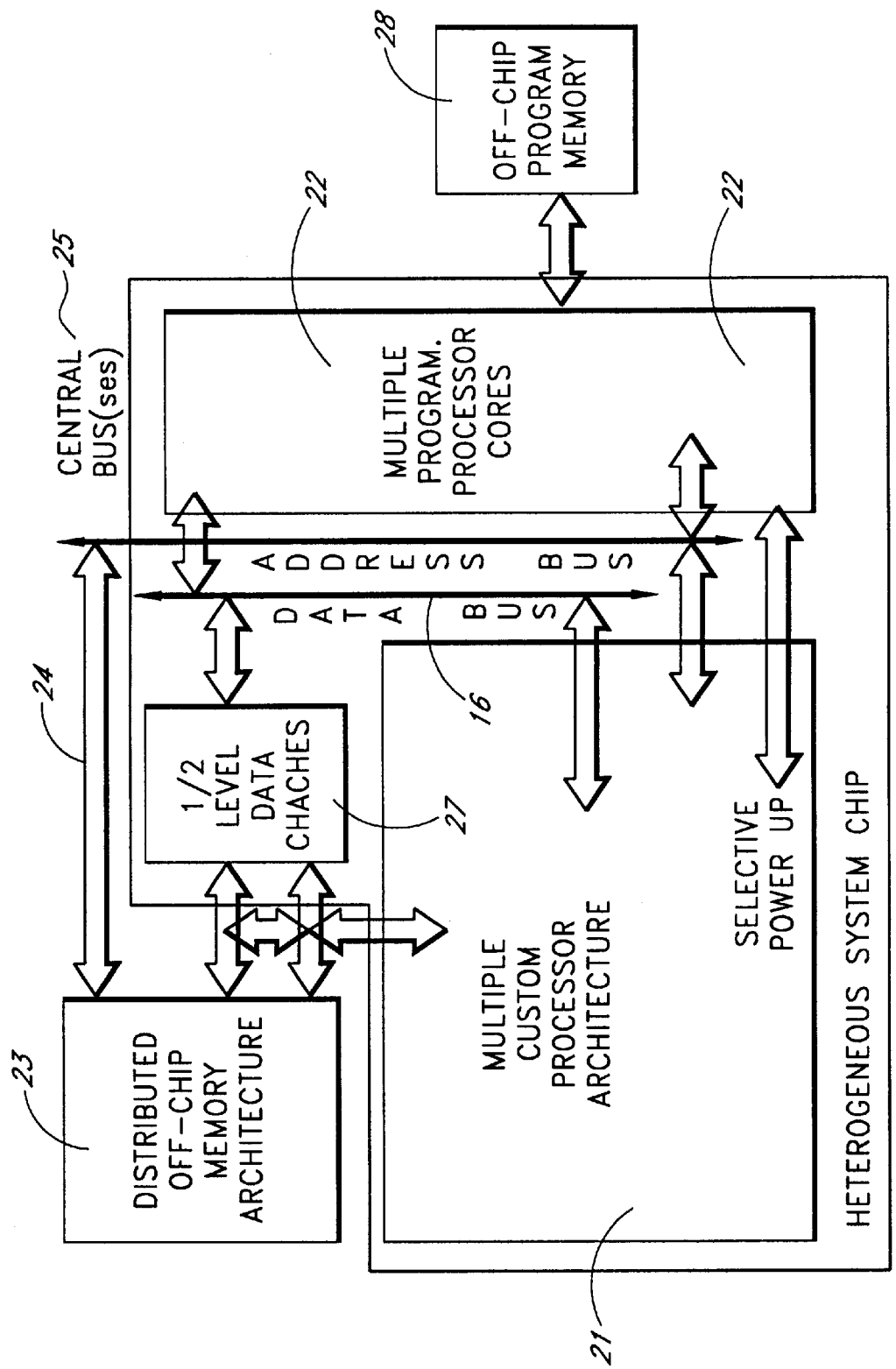
FIG. 6 shows a schematic representation of an architecture in accordance with an embodiment of the present invention.
Figure 7:
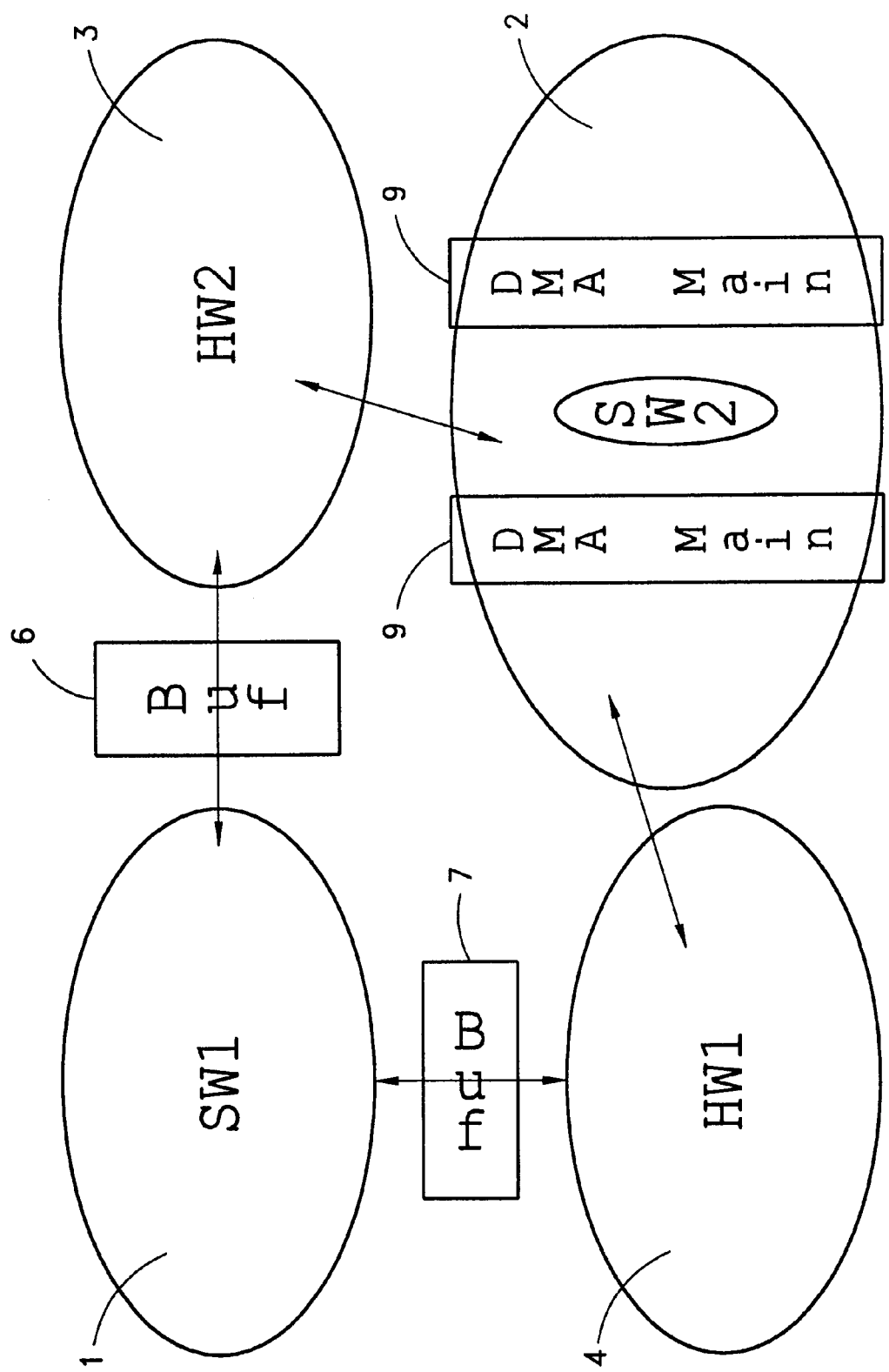
FIG. 7 shows co-operation of SW and HW partitions with only main memory space shared in accordance with the embodiment of FIG. 6.

Initially, all data-dominated tasks are assigned to the CP 22. If a change has to be made to one or more (small) parts of the original algorithm, that routine is moved to IP 21. This involves a context switch where the relevant data has to be passed between the IP 21 and the CP 22. In many conventional approaches this happens by message passing which means copying the data from the CP memory space to the IP space. This involves too many data transfers and loss in power. The first embodiment uses a shared memory paradigm. If the impact on the IP architecture is to be kept as low as possible, this can be achieved by keeping the relevant data in the main memory space 23 of the IP 22 and sharing it with the CP 21 (FIG. 6). This also implies that the preferred points in the algorithm where the context can be switched coincide with the states where all relevant non-temporary data is present in the main memory 23. This means that a context switch between CP 21 and IP 22 is most efficient when no data needs to be copied to the IP 22, but rather the necessary data for IP 22 to continue with the processing is available at the moment of context switching in shared memory 23. This clearly imposes a restriction on the power and speed efficiency of this embodiment: in addition to the algorithm statements which have to be moved because they are modified, also the code around it has to be moved up to the points where the relevant data are shared, both backward (to the inputs) and forward (up to the outputs). This is illustrated diagramatically in FIG. 7. the processing on HW 2 can switch to SW2 when the relevant data for the new routines on SW2 are available to SW2 via accesses 9 to main memory 23. Clearly a trade-off is involved here. If very few points in the algorithm are present where all necessary data is available in main memory 23, the granularity is very coarse and the speed and power overhead of moving the code from HW 21 to SW 22 will be significant because of the large difference in energy-delay product between these 2 solutions. More freedom and a somewhat finer granularity can be provided by adding extra code in the initial part assigned to the CP 21, which makes copies of the relevant data to the main memory 23. But then data transfer and storage overhead is added to the HW side. In accordance with an aspect of the first embodiment of the present invention, the hardware controller of CP 21 is made more "intelligent" so that it can add these copies only when really needed (i.e. when the access point is needed for a context switch). In accordance with this aspect of the present invention the overhead can be largely avoided. When some of the routines in the CP 21 have to be taken over by IP 22, the overall efficiency starts dropping but this embodiment will still remain very beneficial as long as a small amount, e.g. not more than about 10%, of the algorithm has to be transferred from CP 21 to IP 22.

Finding the best compromise between all these conflicting issues is not simple so it is preferred that tool support is provided to have fast system-level power and speed evaluations for comparing the many different alternatives. In particular, the methodology to evaluate the trade-offs can go as follows in accordance with a further embodiment of the present invention:

1. Determine the most optimized data transfer and storage architecture (DTSA) in the initial HW solution. Also evaluate the power/area/timing figures of this DTSA using existing known estimators.
2. Modify the initial DTSA by adding, e.g. extra copies to the main memory 23 or modify the detailed interaction between the IP 22 and CP 21. Again evaluate the P/A/T figures and decide whether the modifications are acceptable.
3. Move some routines from CP 21 to IP 22 and evaluate the P/A/T figures. Decide on the final trade-off between the bigger eventual loss associated with a larger granularity and the bigger initial loss associated with extra copies (potentially reduced in part by a more complex hardware controller).

Note that the IP 22 does not necessarily need to be devoted only to the task of backing up the CP 21 when routines have to be moved. It can be multiplexed in time with other normal tasks which are assigned to the SW. Obviously, however, the less time it remains idle from normal tasks, the less freedom there will be to move routines from the CP side. So here also a design trade-off has to be made. If the IP 22 is fully devoted to the CP 21, its overhead in area should be reasonable compared to the CP 21. In that case, the preferred choice is an ASIP (application-specific instruction-set processor) which is dedicated to support the types of routines present in the CP(s) 21 assigned to it. Such an ASIP can be built very area efficiently and also the power consumption can be kept more reasonable than what is typically needed for existing general-purpose or multi-media processors. If the IP 22 is needed for other reasons (tasks) too, its area overhead will be more acceptable anyhow. Note also that in order to have full power efficiency, both CP 21 and IP 22 preferably exhibit effective power-down modes so that they do not consume power unless when performing useful operations. This may include the use of clock gating measures. Also the clock distribution network is preferably separated for the CP 21 and the IP 22. The 2 clocks can be derived from the same master clock for global synchronization, if desired, but this is not crucial. In principle, the "synchronous islands in an asynchronous sea" concept can be applied where 2 master clocks are present and where the local synchronization between the different synchronous islands is taken care of by handshaking and potentially a small buffer. Obviously, the average rate at which data are communicated is preferably identical at both sides of the asynchronous interfaces to avoid unacceptable buffer overhead.

This first embodiment is easily extensible to a situation where several CPs 21 are present, each with their own adapted master controller. In that case the IP (which can also be duplicated) has to follow them up concurrently. Obviously, this situation is required if the initial algorithm contains concurrent processes. Especially if they cannot be scheduled statically during the HW mapping, this is unavoidable. The dynamically scheduled processes are then preferably moved to different CPs 21, interacting with each other in the conventional way to execute the algorithm, but individually monitored by the IP(s) 22 with the special protocol in accordance with the present invention.

Figure 8:
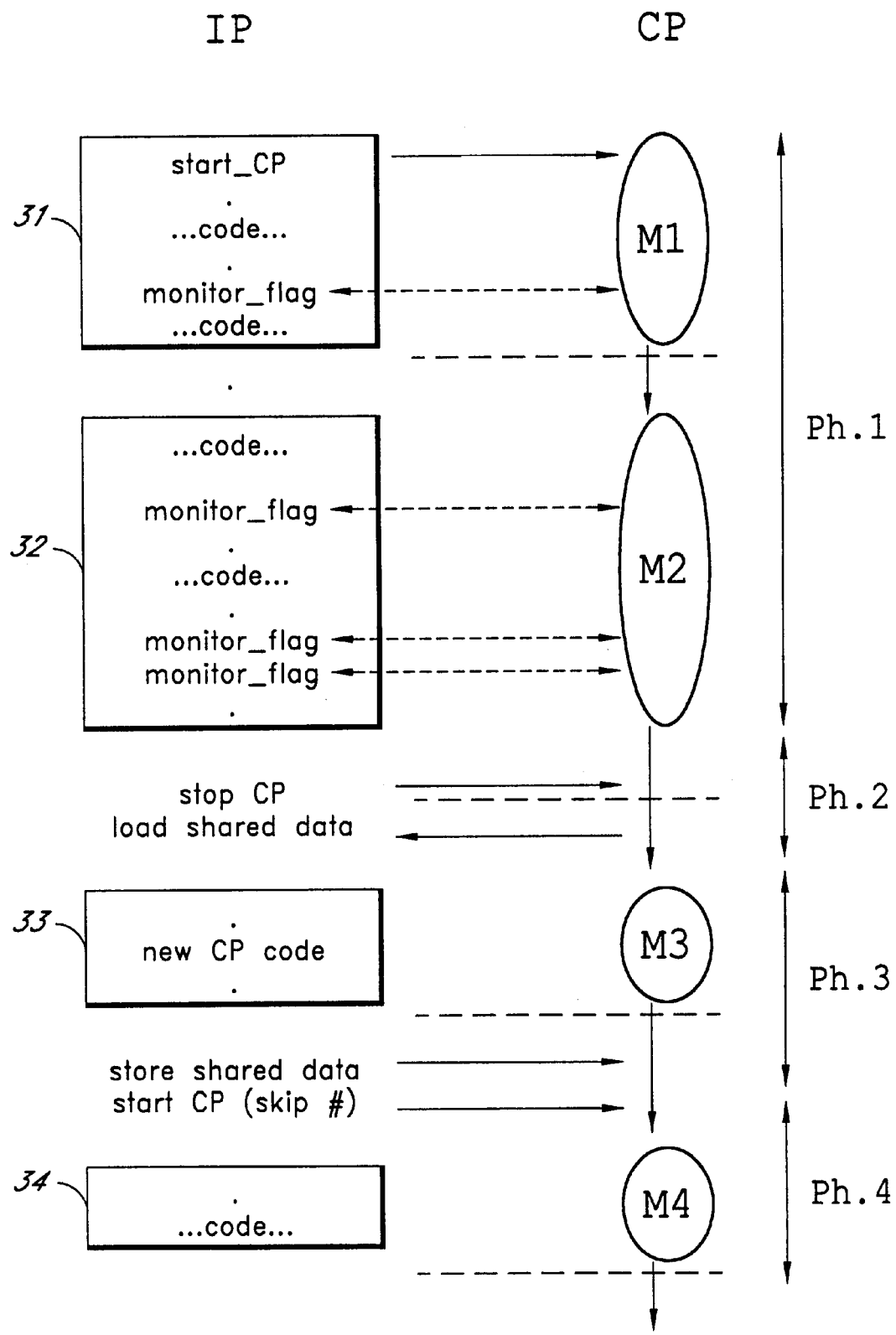
FIG. 8 shows co-operation between IP and CP, with 4 phases when the context switch has to occur for module M3 in the original algorithm mapped to the CP for an embodiment of the present invention.
Figure 9:
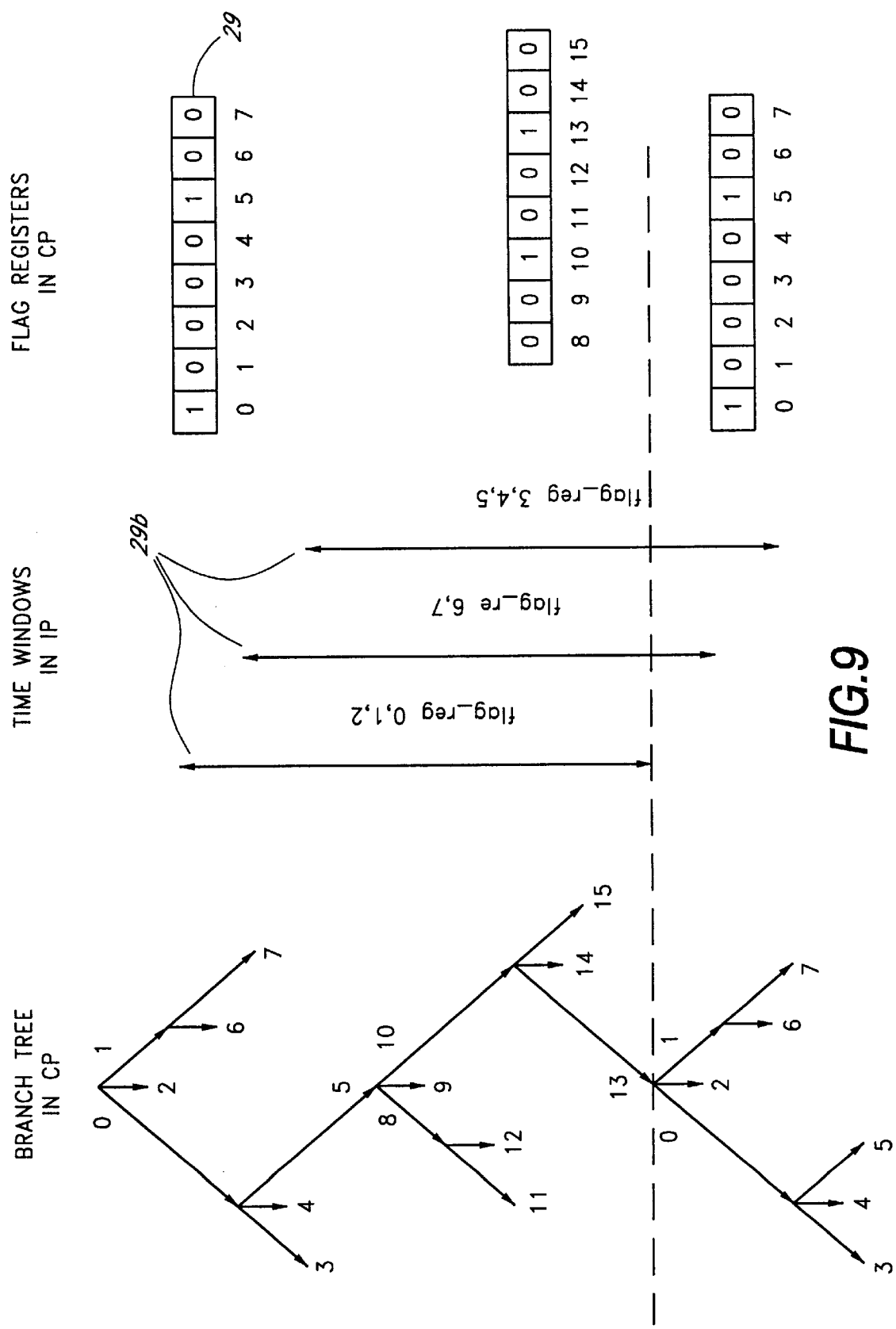
FIG. 9 shows co-operation between IP and CP: monitoring of flags of conditional branches in accordance with an embodiment of the present invention. In general, only part of these flags have to be polled from the IP to follow the actual trace.

An example of a protocol to support the above interaction may have 4 phases and may be as follows (see FIG. 8). Assume that one routine 34 or part of a routine has to be moved from the CP 21 to the IP 22 (M3 in FIG. 9). The general case is easily extended from this. Note that the designer has full knowledge and control of what the CP 21 contains and what program is running on the IP 22. This is important in order to allow effective synchronization. The following provides a description of further aspects of this embodiment.

1. In order not to let the IP 22 be under-employed, nor to increase the lost time while the routine is moved from CP 21 to IP 22, the IP 22 is preferably fully synchronized with the CP 21. This is important to enable relatively fine-grain context switching between CP 21 and IP 22. If the routines running on the CP 21 and IP 22 are very simple and do not involve complex data types, then the proposed protocol is usually too costly and a simpler (modified) master-slave protocol can be applied, as explained in the examples below which are described as modifications of the first embodiment. When the code on the CP 21 is not data-dependent this is easily achieved because the exact cycle at which the context switch has to occur is known. The IP 22 may have a counter (e.g. implemented with an interrupt routine) which ensures that it starts up the context switch at the correct cycle. This situation is however often not present for complex multimedia routines, for which the present embodiment is mainly intended. These applications contain many data-dependent conditions, especially due to the switch between different operation modes. Often these conditions are relatively coarse-grained. In order to follow the traversal of the CP 21 through its code, the CP 21 provides the IP 22 in accordance with one embodiment of the present invention with just enough data to know how to determine the context switching point. For example, sufficient data is provided as to which of the data-dependent branches have been taken so that the exact cycle to steer the counter in the interrupt routine for the context switch can be calculated based on flags. Making the flags available can be done by loading appropriate flags into registers 29 which are part of the IP register space (see FIG. 9). If such registers 29 in the IP 22 are not accessible from outside, then in principle this can alternatively happen by writes to main memory 23 but then the overhead of accessing these simple flags is much larger and the time penalty of the context switches increases significantly. The IP 22 regularly checks on these flags to follow the progress of the CP 21. The time window 29b when these flags are available is usually relatively large, especially when sufficient register cells are available (see FIG. 9), so the timing of the exact cycle of the accesses is not critical and can be planned at appropriate moments while executing another concurrent task. This can occur for example when the part of the IP unit 22 which performs the monitoring of the registers is idle due to some data dependencies in the executing task which hold up everything but the memory transfers units of the IP 22. The elapsed time of the entire monitoring process (which usually has to be executed frequently) should, however, be reduced to a minimum to minimize the overhead of the protocol. Preferably, a tighter (more frequent) control of the status of the flags happens just before the planned context switch (see FIG. 8, increased monitoring in process 32 just before context switch to new code 33), to follow up the CP progress closely.

Note that several simplifying cases exist each of which is a separate aspect of the first embodiment of the present invention. For example, the monitoring does not need to include branches which are not reconverging on the path leading to the selected context switch. This is clear because they can never influence the cycle of the selected context switch. Even when certain paths are reconverging, the corresponding flags do not have to be monitored on condition that the IP 22 checks the exact cycle when the reconvergent point is crossed in the CP 21. This will require a continuous polling during a certain period but this can be worth it on the condition that a sufficient amount of monitoring of the flags can be ignored at other times and if during the period in which the polling should occur, the hardware of the IP 22 involved in the polling is not busy anyhow. Assume, for example, that the top branch with options 0,1,2 in FIG. 9 and all its subbranches (3 . . . 15) reconverge before the edge labelled 0 below the dashed horizontal line splits into 3,4,5. Assume also that the context switch occurs just after label 5 below the dashed line. Then checking the cycle when branch 0 is split at the dashed line can be worthwhile. A final simplification occurs when at a certain node on the path towards the context switch all reconvergent paths on that node have exactly the same cycle count. In that case, it does not matter which branch option has been taken before. Such a situation will seldom occur by coincidence in practice, but it can be deliberately obtained by adding NOPs to unbalanced paths towards the reconvergent node. The cost of these NOPs should be compared with the cost of monitoring the involved flags so again a design trade-off occurs.

2. At the cycle when the context switch is due to start, which is data-dependent now and which coincides with a point in the algorithm when all the relevant data for the 22 to use after the context switch is available in main memory 23, the IP 22 interrupts the CP 21 by sending an appropriate event to the master controller of CP 21. This CP controller stops the execution on the CP 21 and the CP 21 goes into power down mode.

3. The IP 22 then executes the appropriate modified code starting from the data stored at main memory addresses which have been predefined when building the CP 21. After completing this code, it stores the results back into main memory 23 also at predefined addresses (see FIG. 8) ready for the CP 21 to pick up the processing with this data. This preferably requires the availability of a DMA (direct memory access) mode 24 (see FIG. 6) or a mode equivalent to a direct address access mode. Then the IP 22 starts up the CP master controller and provides it with information on how many "steps" it has to skip in the initially assigned code. This can happen again in several ways each of which is a separate aspect of the present invention. The most power and time efficient way is probably to send it special data (constants) which can be directly encoded by the CP controller into the desired state of its master state graph. Note that this state graph only has to contain a limited set of states, namely the ones corresponding to all the points in the algorithm where the context switches are allowed to occur. This data can be sent by dedicated instructions added to the IP instruction-set or use can be made of an already existing IP instruction to put constants on the external I/O bus. In accordance with the present invention this could even be the address bus where an "immediate addressing" mode is used. Alternatively, the appropriate program counter (PC) value can be downloaded from the IP's memory space to the CP. This requires all the potential PC values to reside in main memory 23 and several address and memory cycles are needed to execute the process. This will usually be much less effective and cause more overhead to the protocol.

4. Then the CP 21 takes up its normal operation again and continues the algorithm starting from the new data stored in the shared main memory space 23. The IP 22 goes in power down mode or continues/starts with a concurrent task assigned to SW (1 in FIG. 7).

The impact on the CP 21 and the IP 22 architectures can be summarized as follows:

1. The CP 21 requires an extra master controller which traverses the above mentioned state graph containing only the points of potential context switches. In one embodiment it also has to send to the IP 22 the flags to keep track of the data-dependent branches. It should also be able to skip to the appropriate new state after the IP 21 has finished its modified code, based on the "skip states" information sent by the IP. Such a master controller consumes very little area and power overhead and the design time is very limited because it can be derived easily from a template for a behavioral finite state machine FSM. The main design time will be spent in the above mentioned trade-off of where to put the points of potential context switches, but also this time can be (much) reduced by appropriate design tool support for exploration feedback. Especially accurate high-level timing and power estimates need to be provided, inviting the risk of a (much) less optimal choice being selected.

2. The IP 22 preferably has registers 29 to keep track of the data-dependent context switch flags. Moreover, it has to be able to send data about the states to be skipped and the power-down/up of the CP 21, preferably by way of directly transferred constants (and not over the memory units 23).

3. In order to synchronize the entire interaction between the IP 22 and the CP 21, it is important that at critical moments, i.e. especially at the start and the finish of the context switch, the timing of the IP 22 can be rigorously controlled. So the use of hardware interrupt channels and hardware related caching which involve difficult to control time overhead should be avoided as much as possible, especially during phase 3 of the protocol. This will also reduce the global time penalty of every context switch. So preferably, the IP 22 should support software controlled caching and a very rigorous timing control, in order to ease the strict synchronization with the CP 21. Also DMA 24 to the main memories or an equivalent access mode should be available.

4. Depending on what the available instruction-set offers and on how critical the timing requirements are for the application, changes can be made to the instruction-set processor (IP 22) architecture to improve the co-ordination with the CP 21 along the above lines. Even then, however, in general this overhead will remain small. Many existing multi-media processors or even RISCs offer enough instruction variety to support the protocol in a reasonable way, even without changes. If an ASIP can be used, the cost overhead of adding these modifications is negligible, as demonstrated by the examples below of a custom ACU interacting with an ASIP.

If the data-path of the CP 21 is (heavily) pipelined, at least three solutions are available to handle this (some of these can be combined) each of which is a separate aspect of the present invention:

1. The IP 22 can just wait until the CP pipelines are finished with providing the necessary data and then extract it from the shared address space 23. This means some overhead in timing (delays) and some extra, unnecessary operations started up in the CP pipelines leading to a small power waste. Note also that it is assumed that the data is available in shared address space 23 long enough to allow the IP 22 to read it, which is easy to achieve because the CP 21 is inactive anyway.

2. If the hardware controller of the CP 21 is adapted a little, it can avoid the unnecessary operations because it receives the signal to stop normal operations in advance.

3. Usually the IP 22 has a relatively small bus bandwidth available to the shared address space 23 which means that the data cannot be extracted all at the same time anyway. Therefore, the best option will usually be to already start reading data as soon as the first pipelines are finished. While the other data comes out of the pipelines, it can be read out also by the IP 22. The decision between the alternatives depends on the overhead in P/A/T and design time and a trade-off has to be made again by the system designer.

In the conventional HW-SW co-operation only "slave" HW accelerator data-paths or processors are entered into the architecture. This leads to a master-slave (M-S) interaction. Two main categories exist:

1. Dedicated HW instructions are added to the IP instruction set. Examples include Intel's Pentium MMX or the extensions in other RISCs discussed earlier. Here the granularity of the switch between SW and HW is limited to the level of relatively simple arithmetic instructions. In that case, the power and speed advantage in a multi-media context is largely lost because the IP controller is again responsible for all the data transfer and storage tasks which exhibit the main power (and speed) bottle-necks for data-dominated routines. That also means a very intense interaction of control signals and other data is required between the CP and IP modules. This regularly leads to bottle-necks. Consider, for example, a part of a video processing algorithm where first data has to be stored (and fetched) in a row-based fashion from (part of) the image frames and then in a column-based fashion. For the multi-media extended instructions, which almost always rely on processing n words in parallel which are packed in a 32 or 64 bit data packet, this means that first the n-word packing has to happen row-wise and then column-wise.

2. Use custom accelerator processors combined with a processor. One example is the use of the DirectX technology of MicroSof™ where the operation system can use the HW on a custom graphics card for implementing the graphics pipeline, or it can execute this in SW when the available HW behavior is not appropriate for the given application. Another example is the presence of HW accelerators on many multi-media processors. These are usually intended for graphics processing or to speed up MPEG components like Variable Length Decoding, DCT and the like. Also the use of an ARM processor plus several Cathedral-3 accelerators (including a local controller) in a few recent VSDM experiments, illustrates this. All these HW units have a slave controller where an initial "kick" allows them to start-up. This is however not sufficient to allow the fine-grain context switch of the present embodiment. The control is limited to the granularity of the "slave routine" executed on the accelerator, which could for example be the H263 motion estimation in an MPEG4 context. In that case, a small change within this 20+ page routine requires the entire routine to be switched to the IP side, where the conventional power-consuming data transfer and storage architectures are used. If the HW processor is broken up in many different pieces to try to avoid this inflexibility, the interaction between the single IP and the multitude of CPs will become the bottleneck in terms of both power (communication) and speed for data-dominated applications.

One important variant of the second embodiment includes the use of a master—master (M—M) interaction between two fully-fledged "stand-alone" controllers where the IP side executes the "overall" control and "pokes" the CP side which then "intelligently" acts based on these events. This cannot be mimicked by the use of slave HW controllers for the above mentioned reasons. Note however that the slave instruction based or processor based approaches are usually very acceptable in a context where mainly scalar or control processing has to be performed, as long as the time overhead of the frequent interaction between the CP and IP side is reasonable. That situation is from where the master-slave (M-S) concept originates, but unfortunately the approach breaks down when applied to complex data-dominated routines. So whenever the advantages of the M—M protocol are not clear (the savings should be carefully evaluated and the necessary trade-offs between the different design factors has to be made), the designer can switch to the M-S protocol. This is shown clearly in the examples of the custom ACU interaction with an ASIP processor for both the M—M (master-master) and M-S (master-slave) embodiments of the present invention detailed below. One of the reasons that the M—M protocol may not be preferable is when the cost to do the synchronization in a fine-grain way becomes too large compared to the expected savings. In the examples below a custom ACU with a distributed controller co-operates with an ASIP master controller by adding a special stand-alone controller to the custom ACU. The latter enables a similar interaction protocol as described above but more dedicated (stripped down). As a result, the scheduling of the assembly code on the ASIP can be done independently of the (predefined) HW schedule, i.e. the HW can be partly adapted to the ASIP timing. This interaction between a custom ACU and an ASIP has been generalized for the flexible co-operation between any IP (with controller+ACUs+ALUs) and a custom ACU in the examples below. The experimental results show that the approach works with negligible area/power overhead in the extra controller hardware and that the context switch between CP and IP can be done without real cycle overhead. This allows a very fine grain interaction.

In terms of overall impact the first embodiment can be evaluated as follows:
1. +: flexibility is feasible where desired at compile-time with reasonable overhead in speed and power compared to a fully custom HW solution. The resulting solution is much more efficient than a conventional solution where all the code would be put in SW to ensure full flexibility. The amount of modifications in the program is obviously limited by the overhead in the HW-SW context switch and how many (spare) instructions the SW processor core can accommodate. In practice, this will seldom be a problem however because the main purpose is to accommodate bug fixes, late changes in the marketing based requirements or in the multi-media standards. These modifications are almost always very limited in scope.
2. +: power quite well optimized wherever a large consumption was present in the initial full SW mapping because most of the data-dominated code is running on heavily optimized HW architecture.
3. +: speed quite well optimized because of same reason as power.
4. −: area cost larger than HW solution because also a (small) SW processor core has to be included, which can be shared however amongst several CPs.
5. −: larger design time. Programming of the IP is more difficult (careful synchronization needed), relatively complex trade-offs to make in CP between flexibility and where to put nodes in algorithm with potential cuts. This design time penalty can be removed almost fully with the availability of a library of templates to insert in the IP code and with design exploration support to find a good compromise in the CP. The energy-delay improvement compared to a full SW solution can be significant (at least an order of magnitude if well optimized), and this without a real penalty in flexibility.

EXAMPLES OF THE FIRST EMBODIMENT AND MODIFICATIONS THEREOF

Data-transfer and storage intensive applications are characterized by a large amount of data-flow (load/store) and control-flow (loops and conditional branches) operations involving background memory (i.e., video-RAM, data-cache). Behind these operations, there is quite a lot of arithmetic (address expressions and conditional tests) related to the computation and the selection of the different pointers needed for the storage. This arithmetic, namely addressing, becomes dominant in the overall arithmetic cost. Typically, the addressing involves many linear and non-linear (e.g., polynomial) arithmetic expressions, as found in leading-edge multimedia and mobile communication applications. In other cases, it involves a huge amount of relative simpler (linear) arithmetic expressions that have to be evaluated under extremely tight constraints as found in network protocol processing applications (i.e., LAN/WAN, ATM). Therefore, because of the complexity, the huge amount of the arithmetic involved and, the very tight timing constraints, the addressing becomes a primary source of overhead in the overall implementation cost: power, and especially, speed.

The cost overhead of this arithmetic can in practice be very efficiently reduced by exploiting custom implementation alternatives. This is especially true in addressing where the opportunities to exploit system-level similarity and regularity in both control and data flows are by far larger than in the "purely" data-path related operations, thus allowing breakthroughs in speed improvements with very low area and power impact.

In addressing, most of the arithmetic is known (manifest) at compile time. Therefore, it can be performed locally, close to the memory address ports. Thus, by using a distributed (custom) addressing architecture in accordance with a further embodiment of the present invention a considerable amount of the routing overhead, typically present in memory dominated architectures, can be avoided. However, this embodiment requires the addressing unit to be physically decoupled from the system processor, for example in a custom Address Calculation Unit (cACU). This partitioning strategy usually leads to better results overall, despite a small overlap in functionality in the control logic. For instance, in accordance with one aspect of this embodiment the occasional duplication of branches which are evaluated by both the system processor and the distributed custom Address Calculation Unit (cACU). Also, the complexity of the system controller is positively affected since most of the control-flow of the addressing, at least the manifest one, is directly managed by the cACU, thus relieving the system processor controller of this task.

However, not only efficiency is gained by the decoupling of the addressing functionality. It also provides the possibility to select more flexible and (potentially) economic implementation alternatives (each an a aspect of the present invention) for the non-address related functionality while combining it with power efficient and high performance implementation targets for the addressing, and very low impact in the processor architecture.

In accordance with a further aspect of this embodiment, Application Specific Instruction-set Processors (ASIPs) allow a very fine-grain (concurrent) co-operation with the cACU by influencing both the instruction set and the compiler. For other Instruction-set Processors (IP) (RISC/DSP cores and multi-media processors) it can be sufficient to have an instruction-set large enough to reuse some of the existing instructions (3 in total are needed, as shown in the detailed description of this embodiment of the invention) to achieve fine grain co-operation.

Flexibility after the chip is processed is still possible in accordance with this aspect of the second embodiment since any new or modified addressing functionality can be taken over again by the IP. This solution remains efficient as long as the amount of address functionality to be modified is not too large (typically, less than a 10 to 20%).

Figure 10:
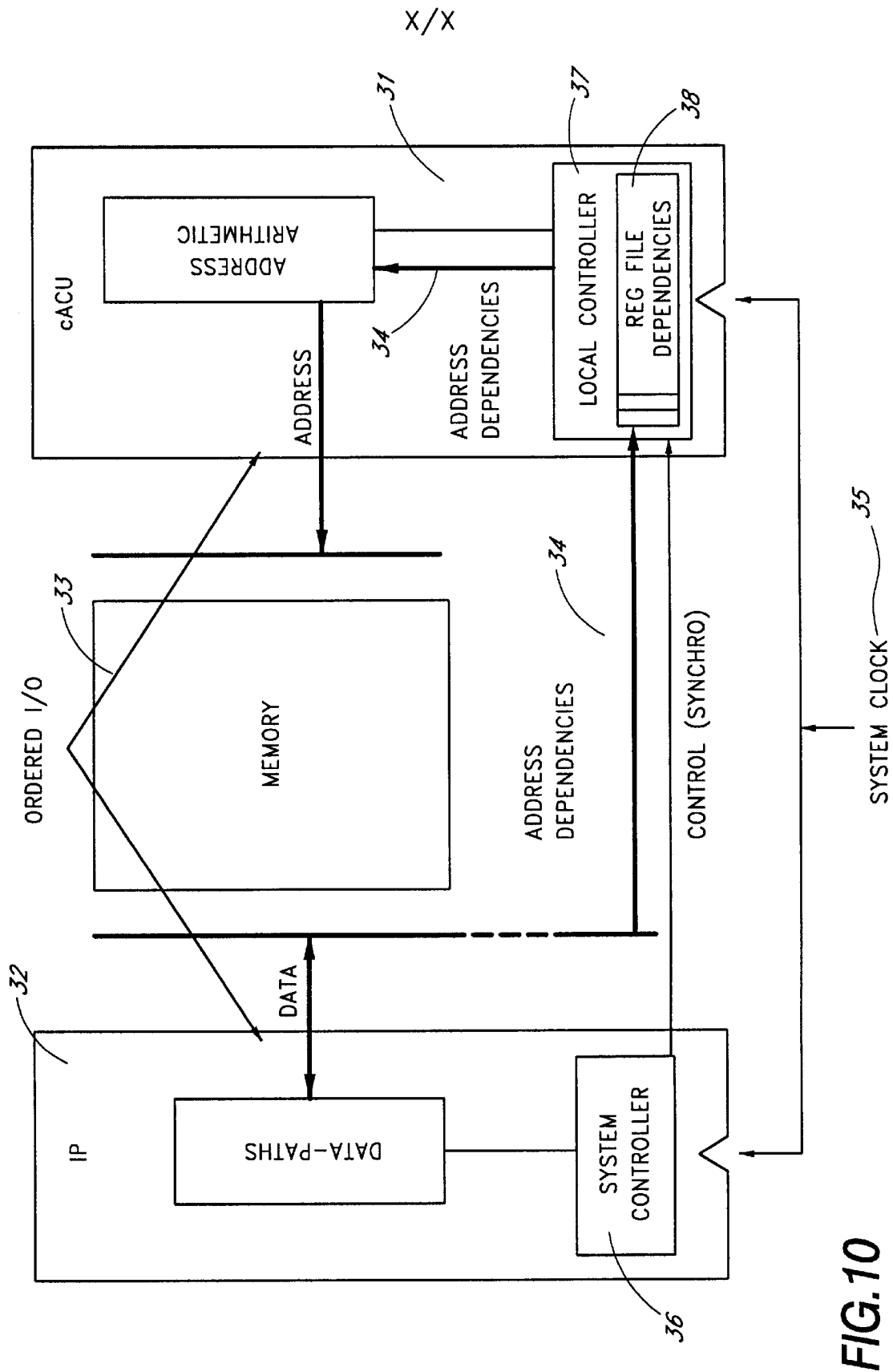
FIG. 10 shows a system level architecture in accordance with another embodiment of the present invention for co-operative addressing.

The following embodiments may provide an efficient fine-grain co-operation between a cACU 31 and a generic IP 32 (FIG. 10). The methodology is partly derived from the interaction protocol proposed in the description of the second embodiment of the invention above. The use of distributed custom Address Calculation Units (cACUs) 31 in accordance with this embodiment of the present invention allows to meet very tight cycle budgets for both memory-addressing related arithmetic and control-flow with very low area-power overhead. This is especially true for memory intensive applications with quite a lot of complex indexing involved. Still, in most cases, some degree of flexibility is needed to absorb late or after-production specification changes. The required flexibility can be achieved by providing a methodology for fine-grain context-switch between the cACU 35 and the programmable instruction-set based processor (IP) 32. These embodiments are based on two fine-grain co-operative models for addressing, firstly a concurrent master-master model and secondly a non-concurrent master-slave model. This fine-grain context-switch allows to incorporate new functionality with minimal power/cycle overheads, so the saving in moving some addresses from the IP 32 to the cACU 31 is largely kept.

Decoupling (part of) the addressing functionality from the rest of the system offers the advantage of a fully concurrent (master-master) co-operation model in accordance with this aspect of the first embodiment of the present invention. Thus, the IP 32 can be devoted to other tasks while the cACU 31 takes care of managing the (distributed) memory 33 itself Otherwise, if the cACU 31 would just be a "slave", the IP 32 would spend a significant amount of cycles just to control the cACU 31, becoming idle as long as the cACU 31 is busy with the actual computation. Note that it is also possible for the IP 32 to manage some of the memory accesses itself, especially those involving "cheap" addressing, thus leaving the cost-dominant ones to the cACU 31 and enabling a mixed co-operation model.

A non-concurrent (master-slave) co-operation is possible for cases where only few cACU operations have to be initiated, by explicitly pipelining the cACU operation with other IP-operations some cycles before the address value is needed. However, for this case, detailed timing (scheduling) information of the IP-operations will be necessary which is not always available at compile time and which can be avoided by a fully concurrent model. For the concurrent (master-master) model, only the timing information about the actual memory-transfer is mainly needed. It is not necessary then to force the IP scheduler to pipeline operations for explicit synchronization with the cACU 31.

Both master-master and master-slave co-operation models for an IP and a cACU are independently included within the present invention as modifications of the first embodiment.

To avoid further communication overhead, the order in which the memory-transfers managed by the cACU 31 occur has to be decided beforehand, thus allowing at compile time to know the sequence of events happening in the address bus. Otherwise, the only possible co-operation model is using a master-slave model, where the master IP 32 has to specify the slave cACU 31, (via an encoded instruction) which address expression needs to be provided in the address port, thus putting an extra load on the IP resources. This strategy applies to both master-master and master-slave models.

To allow full co-operation between the cACU 31 and the IP 32, a communication channel 34 (see FIG. 10) may be provided for run-time communication of the data-dependencies. This channel 34 can be dedicated to this specific purpose. For DSP and RISC cores, one of the available data-busses or dedicated I/O ports can be used. The advantage of using a dedicated channel 34 for the communication is avoiding to overload the existing data-bus(ses). Thus more freedom is left to the scheduler for the memory-transfers.

This communication channel 34 is devoted to two purposes:
1. to communicate the data needed to let the cACU 31 decide on the computation of certain address expressions subject to non-manifest conditionals; and
2. to support address indirection arithmetic.

All communication between the system processor 32 and the cACU 31 is therefore mainly devoted to resolve only run-time data-dependencies and to explicitly synchronize the evolution of both threads of control (the IP 32 and cACU 31). For the master-master model, this explicit synchronization is limited to the specific points where the original functionality has to be modified (namely at a context switch), as described above with respect to the second embodiment of the present invention, i.e. a context switch takes place whenever a new functionality is added or modified with respect to the initial version of the application, which means that some parts of the original functionality assigned to the cACU 31 are taken over (in a modified form) by the IP 32.

Sometimes, the IP 32 needs to follow the traversal of the cACU 31, specifically when data-dependent conditional branches are being decided locally in the cACU 31 and the context switch needs to happen inside one or several of them. Normally, the traversed paths result in unbalanced conditional threads. Thus, it becomes very difficult to predict when the context switch should happen. To concurrently match the unbalanced evolution several design options are possible all of which are aspects of this embodiment of the present invention:

1. Use cycle-true "mirrors" of the conditional trees in both cACU 31 and IP 32. This solution may be inefficient since both mirror copies would have to progress at the same rate. Thus, either the speed performance of the cACU 31 will be limited to accommodate the slower IP 32, or the clock frequency of the IP 32 will have to increase, thus affecting negatively the overall power consumption.
2. Let the IP 32 monitor the branch evolution of the cACU 31. This can be done using both polling or software-interrupt based mechanisms both of which are individual aspects of this embodiment of the present invention. In both cases the cACU 31 loads the appropriate flags (one flag per conditional branch taken) in the registers which are part of the IP register space, as proposed in the above first embodiment.

This architecture allows to define a synchronous co-operative model, mainly constrained by the order of the memory accesses that are subject to custom addressing. Otherwise, both performance and cost (area/power) efficiencies can be very limited. Also, the use of related clocks derived from the same system clock 35 is mainly needed for efficiency in the high-level synchronization between both threads of control (the IP 32 and the cACU 31). In the master-master architectures, it affects the synchronization of both schedules (IP 32 and cACU 31). In the master-slave case, it affects the pipelining of the operations of both blocks. In case of related clocks suffering clock-skew problems, it is possible to use a low-level asynchronous protocol for the communication of the data-dependencies, independently of the model chosen.

A first model allows a master-master concurrent evolution of the two threads of control (one for cACU 31 and one for the IP 32). This model is a specific case of the custom block described in a more generic way above in the first embodiment of the present invention and refined for a cACU 31 as an individual embodiment of the present invention. The synchronization in this case is implicit by estimating/controlling, but at compile time, the elapsed time between the memory-transfers subject to custom addressing. Typically, for data-transfer intensive applications, the memory accesses to the slower memories dominate the overall system timing. Thus, one possibility is to concentrate on the memory-transfer and assume that the compiler will schedule the transfers such that they are kept in the same order as in the original algorithm. Therefore, by controlling the compiler (as it is the case for some ASIP's) it is possible to predict when the memory-transfer is taking place. Another possibility to gather this timing information is by analyzing the scheduling output of the compiler. Note, that there is no need to have all details of the scheduling but just these related to the memory access operations which are subject to custom addressing. In both cases, no control-flow decisions shall be left at run-time (e.g., hardware-cache, interrupts, etc.) to prevent modifications on the scheduling after compilation.

The second model also allows concurrent co-operation between the two-blocks but now the synchronization is explicit by using a master-slave model where the IP 32 is master of the control-flow. The advantage of this model is the simpler design. The disadvantage is that the IP 32 is more occupied with controlling the cACU 31 so it cannot perform other tasks while the cACU 31 is busy with the actual address computation or while the interaction to transfer data is going on.

Figure 12:
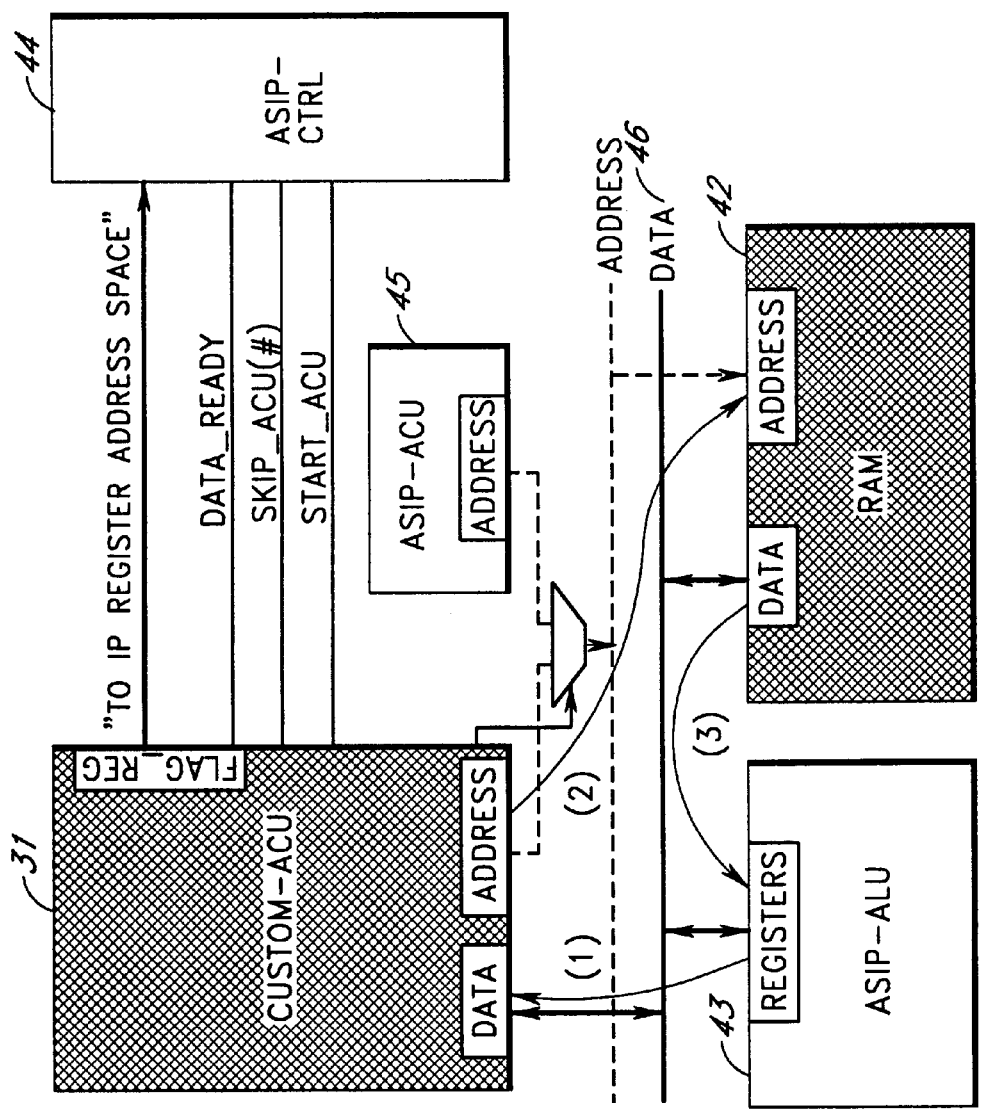
FIG. 12 shows schematically a master-master protocol in accordance with an embodiment of the present invention for normal operation mode.

The operation modes of the first model, i.e. a master-master model, will now be described (see FIGS. 12A and B) as an embodiment of the present invention. The first mode described is the normal operation mode. It is intended for the first functional version of the application, where the cACU 31 is implicitly synchronized with the IP 32 at the points where the memory accesses occur subject to custom addressing.

The second operation mode (modified operation mode) is intended for "modified" versions of the initial functionality. Here, explicit synchronization for the points where the context switch takes place are provided.

During the normal operation mode (FIG. 11A), the IP 32 has to communicate to the cACU 31 all necessary data-dependencies needed for the address indirection or the conditional branches. These dependencies are stored in a dedicated register file 38 inside the cACU 31 (FIG. 10). The IP 32 "notifies" the cACU 31 that a data-dependency has been transferred by activating a special control line (the data-ready line of FIG. 12 and FIG. 11).

The cACU 31 starts to compute the next address within the next cycle(s), as soon as the data-dependencies needed for the next address computation are received. The cACU 31 "knows" how many data-dependencies need to be communicated at runtime time because the state status of its master controller 37 is known and the number of data-dependencies needed for this particular state is also known at compile time. Thus it is necessary to know at compile time in which exact cycle each of the data-dependencies is going to be communicated. The only restriction for this protocol is that the IP 32 must start to communicate all data-dependencies for the actual memory-transfer once the previous memory-transfer has taken place.

To allow further trade-off of power, cycle and area during the design of the cACU 31, the address expression can be split into subexpressions. Then, each subexpression is computed within one clock cycle and the partial result is stored in a internal register. Therefore, since the CACU 31 also "knows" at compile time how many partial data-dependencies are needed for the actual partial computation, it is always possible to wait until all partial data-dependencies have been transferred and, only then, perform the partial computations progressively.

Preferably, the relative order of the communicated data-dependencies should be known at compile time to avoid an overhead in the register file which is devoted to store these dependencies inside the cACU 31. However, this requirement is not essential if the size of the register file 38 can be made large enough. Based on this order, the CACU master controller will allocate the received data in the corresponding register 38 whenever the IP 32 "tells" the cACU 31 that a new data value is ready in the communication channel. This is possible since both the IP 32 and the cACU 31 "know" which is the next event (or set of possible events in case of conditional branches) happening on the address bus. Therefore, the assignment of the data of the registers 38 can be decided at compile time.

Once the IP 32 has communicated all necessary data dependencies for the computation of the next address (including the ones needed for the selection of the conditional branch) the cACU 31 proceeds to provide the address value in the cycle where the IP 32 needs to perform the actual memory-transfer. This can happen without the IP 32 having to know which is the actual bus access protocol of the accessed memory. The cACU 31 relieves the IP 32 of the details of the transfer, especially the protocol between the data and the address busses of the memory 42 accessed. This can be extended towards a more generic customized Memory Management Unit (cMMU) (itself an embodiment of the present invention) that takes care not only of the addressing itself but also of controlling the transfers involved when moving data from one memory hierarchy level to another one (similar to a customized software-controllable cache).

The main pre-requisite to allow full synchronization between the IP 32 and the cACU 31 is to have full control of the evolution of the IP 32 at compile time for timing estimation. Therefore, no run-time interruption nor run-time caching decisions should be allowed at the critical periods of interaction. This can be very easily achieved when using an ASIP as the IP 32, but also other cores like DSPs or even instruction-set based micro-controllers (ARM, etc.) can be used by (temporally) disabling their run-time features.

Figure 11A:
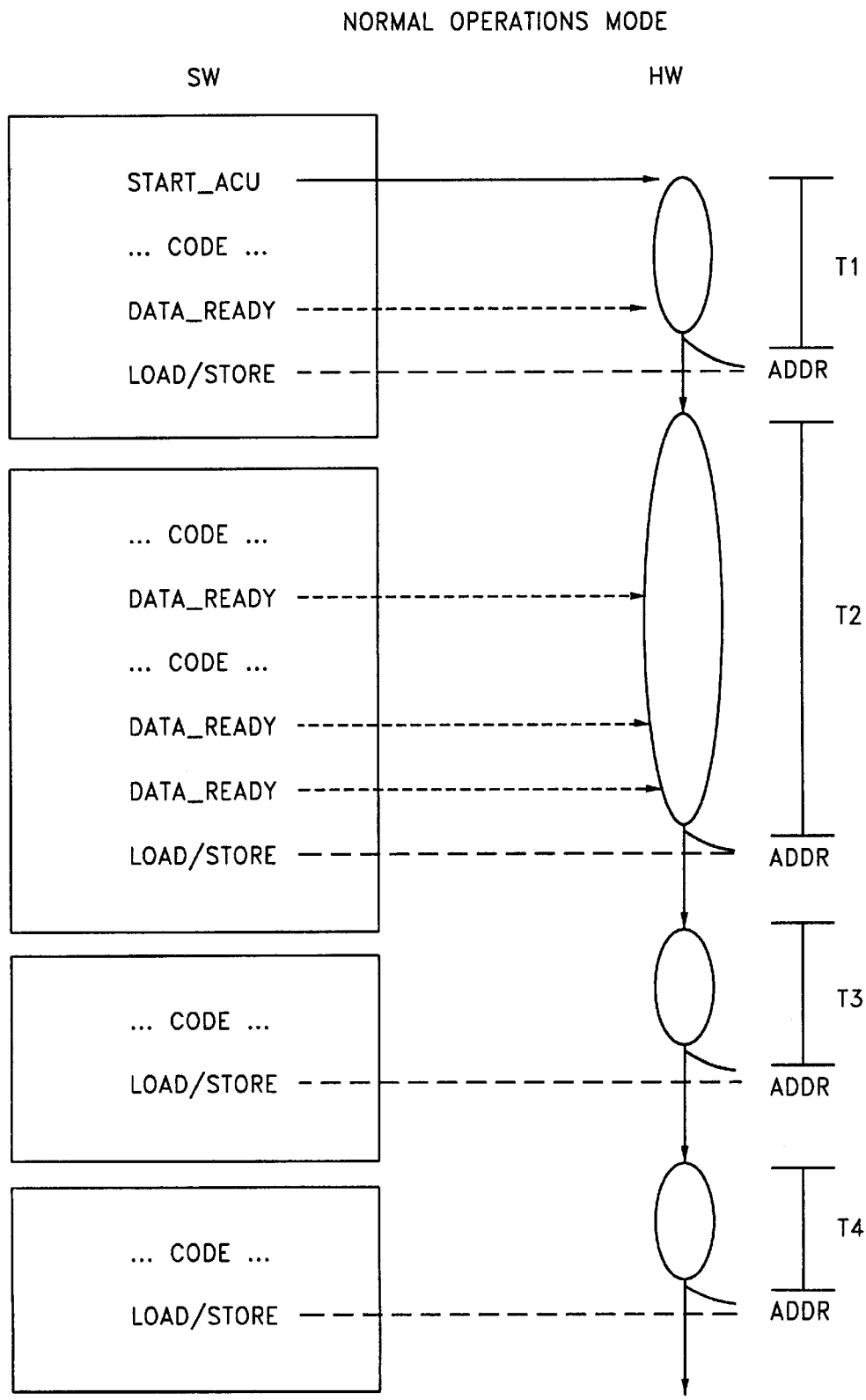
FIG. 11 shows a context switch schematically for a master-master co-operative cACU in accordance with another embodiment of the present invention.

The normal operation mode is illustrated in FIG. 11A. Every piece of code between two consecutive memory-transfers (only those decided to be performed in hardware) defines a super-state mode. The evolution of the super-states is known by both IP 32 and cACU 31 as explained above. The actual memory-transfer triggers the transition between super-states. All necessary data-dependencies are communicated inside each super-state.

The synchronization with the IP 32 happens implicitly, since the time needed by the IP 32 to compute the code for each super-state is known and controllable at compile-time (T 1, T2, T3, . . . ). The IP 32 implicitly avoids scheduling any operation related to the complex address expression in its own ACU 45 since an existing corresponding load/store instruction is used to perform the actual transfer. The internal IP ACU (IP-ACU) 45 can be used however to initiate another address computation which is simple enough to remain assigned to the IP 32. Only the cACU 31 needs to disable the access of the IP-ACU 45 to the shared address bus to avoid data collision (see FIG. 12).

Once the memory-transfer occurs, the IP-ACU 45 is again available for the IP controller 44. Note that also between super-states, the IP scheduler 44 is completely free to allocate any operation in its internal ACU 45 for memory accesses which are not initially managed by the cACU 31 (e.g., those which can be very efficiently performed inside the IP-ACU 45).

Changes in the initial version of the functionality fixed within the cACU 31 can be very easily incorporated in the programmable block (IP 32) as long as the procedure to perform a context switch from the cACU 31 to the IP 32 is provided. This procedure has been described in general above for the first embodiment of the present invention and is particularized here for the case of addressing. This functional mode is known as the modified operation mode.

Figure 11B:
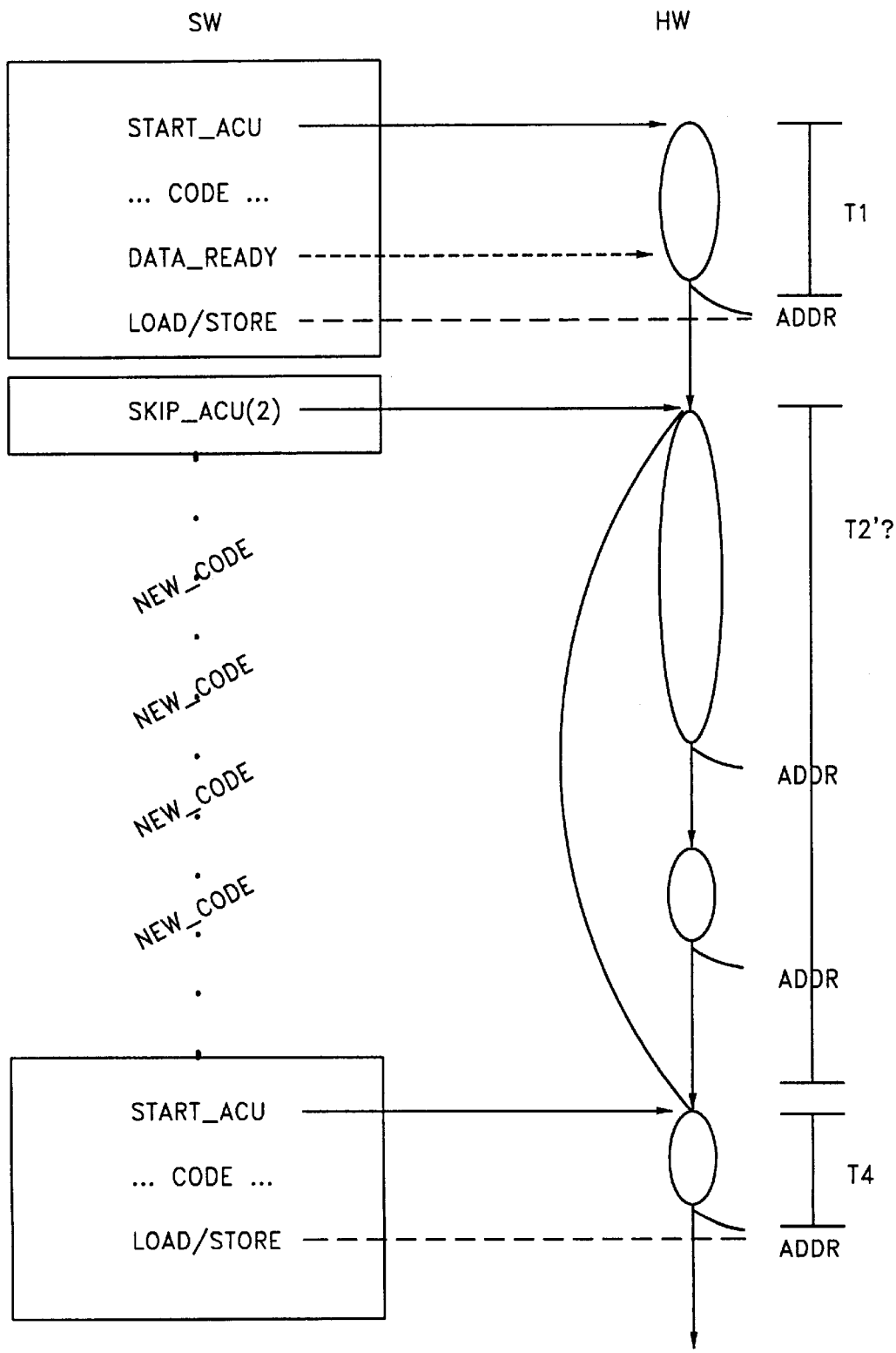

The procedure to perform the context switch starts whenever the IP 32 "tells" the cACU 31 that a number of memory-transfers should be skipped (skip-acu(2) in FIG. 11B). Then, the cACU 31 skips the specified number of super-states and goes to a power-down mode. Once the modified code has been executed, the IP 32 synchronizes again with the cACU 31 (start-acu) to power-up and continues with the normal operation mode. The IP 32 can monitor the evolution of the conditional branches of the cACU 31 by polling the dedicated flag register. To make possible such monitoring without too much overhead, the cACU 31 is preferably able to access the IP register space in the controller 44. Otherwise, the communication of the conditional branch status will have to be done via memory 42 or by introducing a new communication protocol via the existing shared data-bus 46, thus allowing the cACU 31 to dump data on the bus 46 (see also description of first embodiment above).

Figure 13:
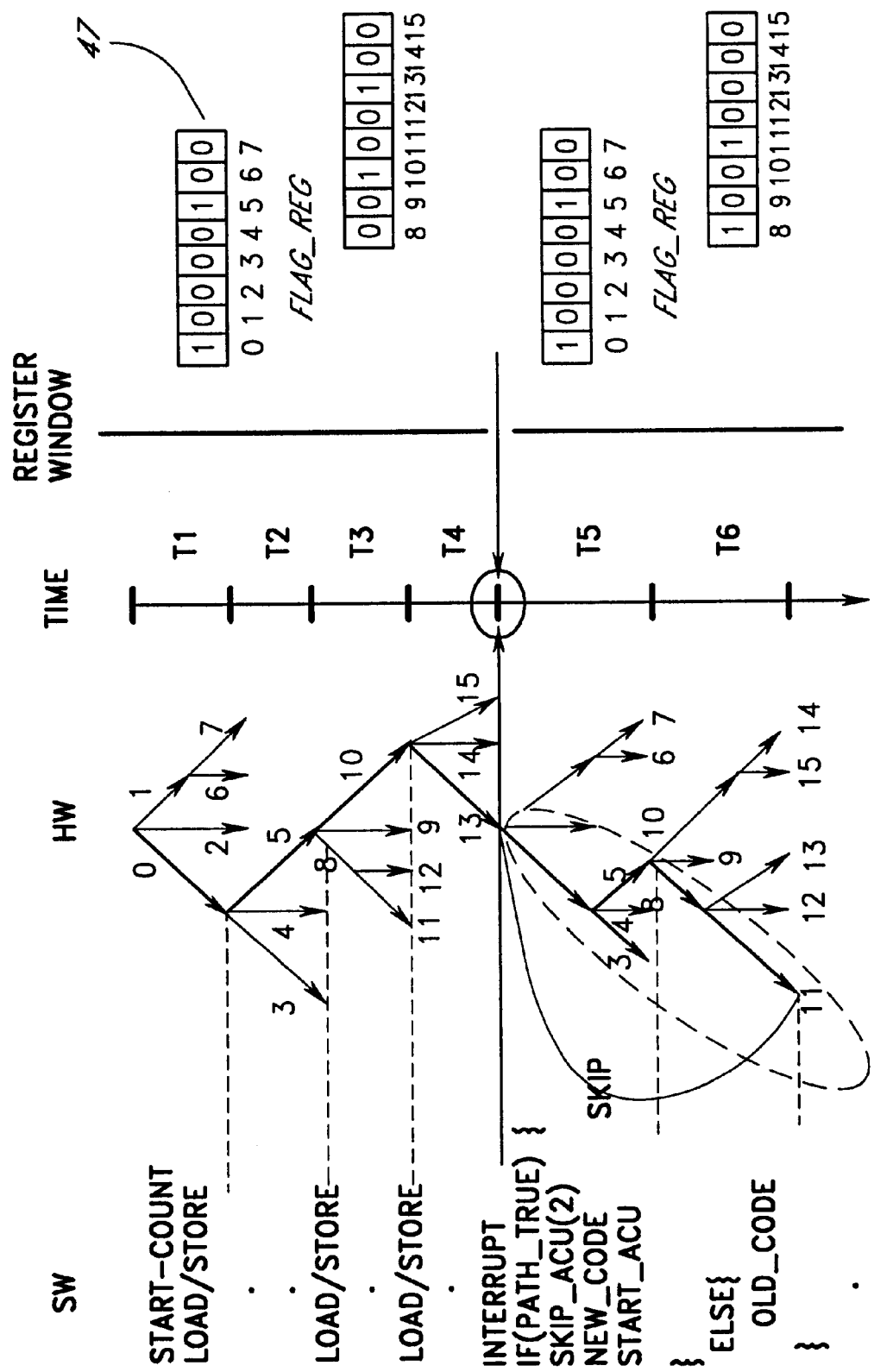
FIG. 13 shows an interrupt procedure for conditional trace monitoring of cACU by the IP in accordance with an embodiment of the present invention.

A concurrent monitoring of the conditional traversal of the cACU 31 is possible by letting the IP 32 monitor the status (flags) of the conditional branches mapped in the cACU 31, as described with respect to the first embodiment of the present invention above. The monitoring of the conditional traversal can be done by letting the IP 32 (at the beginning of the super-state where the context switch should happen) poll a special register 47 where each bit reflects the status of the branch which has been selected (see FIG. 13). To avoid an explosion of the register size, a number of these registers 47 could be used which could be then shared by different portions of the IP code. FIG. 13 shows a situation where one of these registers 47 has been allocated. It is alternatively shared by different blocks of code to increase the time window where different flags of the conditional branches of the cACU 31 can be monitored. A clear trade-off between the register size, the number of registers 47 and the size of the time window available for flag monitoring is thus possible as discussed above in the first embodiment of the present invention.

To perform the context switch right before the cACU 31 is about to take the branch that the IP 32 will take over, a software-controlled interrupt is used. In this case, the problem for the IP 32 is to "know" in which exact cycle it should interrupt the cACU 31. This problem can be solved if the conditional branches subject to context switch within the cACU 31 are equally balanced (same number of cycles). Therefore, irrespective of the path traversed, the moment in which the memory-transfer should happen is always the same and known at compile time.

Internally, the IP 32 can control the time-to-interrupt by using an existing dedicated timer. If the context of the flag register 47 indicates that the branch to be modified is about to be taken, then the cACU 31 is requested to skip the corresponding number of super-states. FIG. 13 shows an example of the procedure.

There are different ways to balance the conditional branches present in the functionality assigned to the cACU 31. This depends on how big is the difference in cycles amongst the conditional branches (branch distance). If the distances are small enough, then a solution can be to split the address expressions which are located in the transfer branches into subexpressions and perform the computation in several cycles (1 cycle per subexpression). In case that either this approach leads to too much area and/or power overhead or the "distance" in cycles amongst branches is too large, then an alternative can be to include "dummy" operations (No-Operations: NOPs) in the faster branches (as described in the NOP variant of the first embodiment above). However, the addition of NOPs can also lead to a power overhead if used too extensively.

The interrupt based mechanism can be combined with flag-polling (which doesn't contribute to power degradation) to gradually let the IP 32 monitor the evolution of the cACU 31. Only at the critical points which are close to the context switch, the IP 32 can start the countdown for the moment where the interrupt should happen.

If a master-master protocol is needed, it may be beneficial to let the cACU 31 take over all the tasks (including the evaluation of the conditional branches). In this case, then a similar policy for monitoring the status of the cACU 31 as proposed in the first embodiment of the invention could be applied to let the IP monitor the branch selected by the cACU 31.

To avoid that the IP compiler re-schedules the memory transfer operations once it is re-compiled thus changing the order of memory transfers originally present in the code which is situated "after" the context switch (see FIG. 11), at least two alternatives are possible, again depending on the type of IP used (ASIP or DSP/RISC cores).

For DSP/RISC cores where it is not possible to constrain the scheduler, one option could be to collect clusters of super-states inside functions and perform function calls from the main code. Since compilers do not schedule operations beyond scopes then all the code belonging to the function call scope will remain "untouched".

Nevertheless, this may result in too much overhead if the amount of super-states is too large (too small functions have to be in-lined to have efficient compilation). When there are too many super-states, another option is to provide sequencing constraints to the cACU scheduler (or IP compiler). The feasibility of this depends on the scheduler used.

Figure 14B:
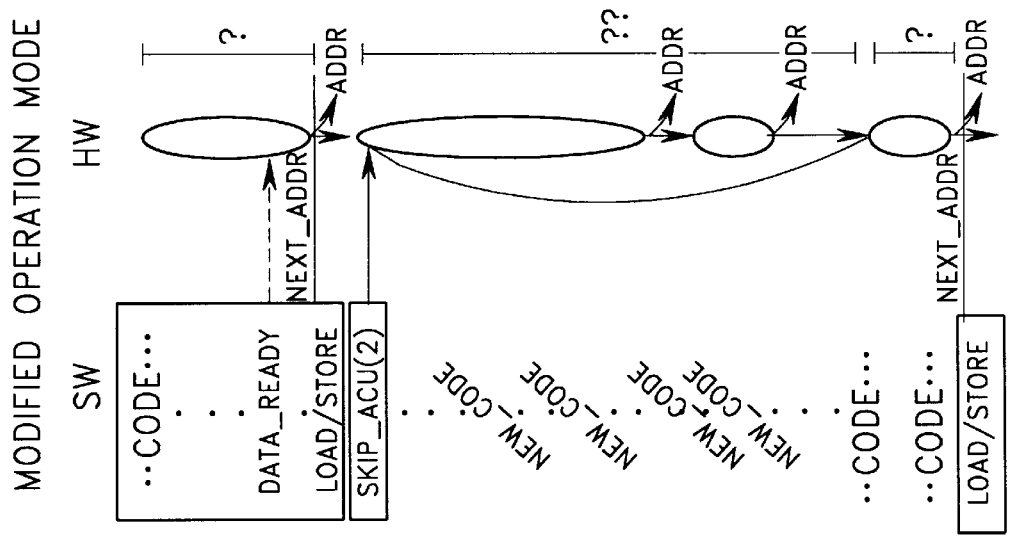
FIGS. 14A and B show normal and modified operation modes including a context switch for a master-slave co-operative cACU in accordance with an embodiment of the present invention.
Figure 14A:
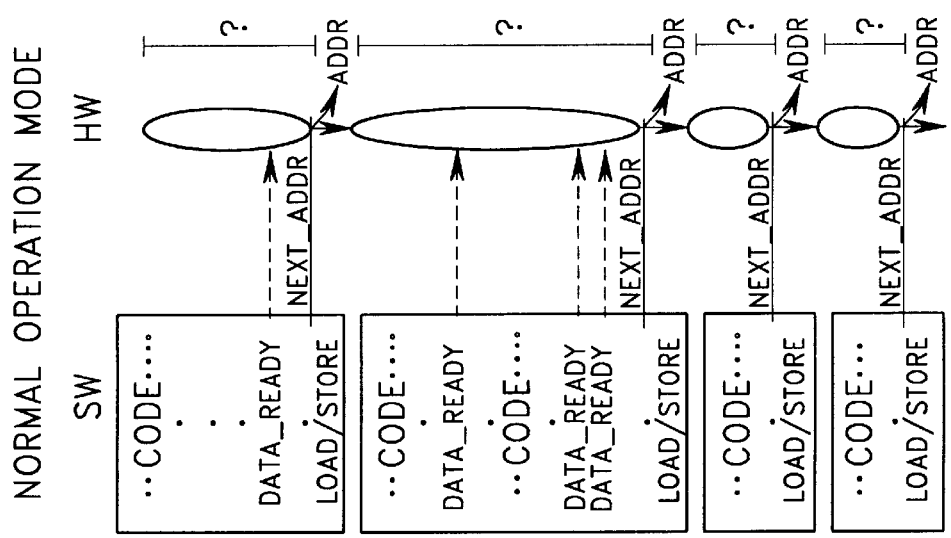
Figure 15:
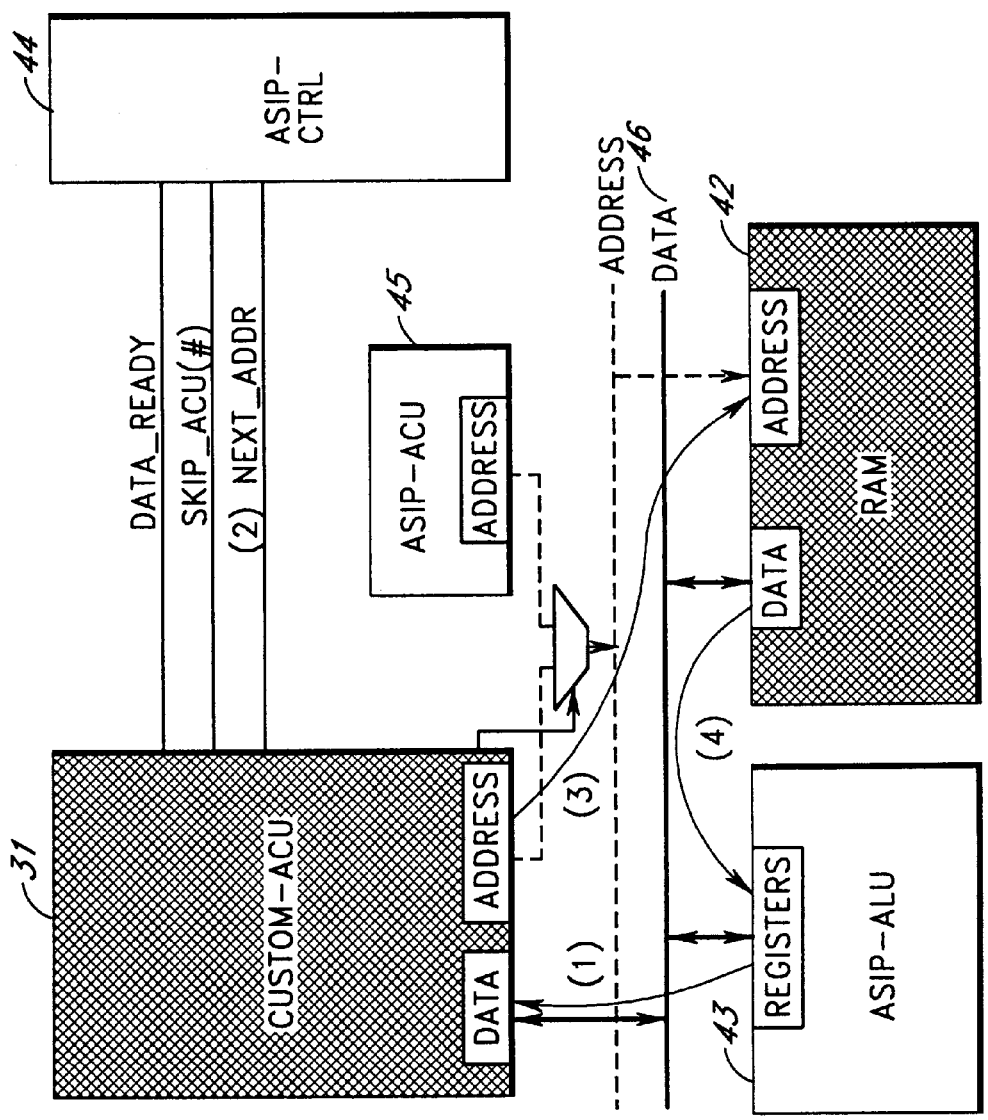
FIG. 15 shows an interface architecture between a cACU and an IP for a master-slave normal operation mode in accordance with an embodiment of the present invention.

The normal operation mode in a full master-slave scheme (FIG. 14A) is intended for a further embodiment of the present invention where the cACU 31 is explicitly synchronized with the IP 32. The master-slave scheme is very useful when the synchronization overhead for the master-slave protocol is very low or when the IP 32 cannot do anything useful during these cycles anyway. It is also useful when very little or no control of the IP-scheduler at compile-time is possible (which is the case of some RISC cores). For this co-operative model, both normal and modified operation modes are very similar to the ones proposed for the master-master architecture but now one of the control lines needed from the IP-controller is different (next-addr in FIG. 15). This line is in charge of performing the explicit synchronization mechanism. This control line is set-up one cycle before the IP controller 44 schedules the actual load/store operation.

For the master/slave architecture, the load/store operation used for the transfer subject to custom addressing should preferably be different than the one used to typically load the address value from the IP-ACU 45. This is required to allow the IP 31 to use its internal ACU 45 for other "cheap" accesses. Many cores have enough instructions available such that an existing load/store operation can be reused.

Note, that for this model it is not necessary to indicate to the cACU 31 when the context switch has finished since at every access the cACU 31 is explicitly synchronized all over again.

The main disadvantage of the master-slave scheme is the impossibility to perform tasks in both IP 32 and cACU 31 concurrently, as is preferred in the first embodiment of the present invention. This results in an extra step necessary to complete the co-operation protocol (see FIG. 15, step 2). The cACU 31 must "recognize" when an address needs to be provided (next-addr) and this introduces an extra step in the protocol. During this step, the cACU 31 becomes active and the IP idle until the completion of the address computation (which can usually be done within one clock cycle). This is in contrast to the master-master embodiment where no explicit synchronization is needed. When not too complex or too frequent addresses are provided by the cACU 31 this idle time is acceptable.

Three instructions are needed to perform the complete normal and modified operating modes plus the already existing load/store operation. Two of them, data-ready and skip-acu (#states) are common to both embodiments: master-master and master-slave. However, the third instruction differs slightly in semantics. In both models the third instruction "means" that an action in the cACU 31 should be started. In the master-master model the "start" action triggers or continues the control thread of the cACU 31 (start-acu). In the master-slave model, it just triggers one super-state transition of the corresponding control-thread.

When an ASIP is used, the new instructions can be incorporated easily and the corresponding compiler can be modified without big overhead. For fixed architectures (DSPs and RISC cores), the instruction-set available is usually large enough to reuse some existing instructions to mimic the desired semantics. For instance, the next-addr instruction needed for the master-slave model can be mimicked by a simple load/store operation with some control logic that triggers the next-addr as soon as the load/store is being decoded. Another example is the ARM architecture which provides two instructions to communicate a data-dependency to a co-processor. These can be reused to execute the operation in the co-processor that could be reused i.e., for the data-ready and the start-acu operations respectively.

It is always possible to use the I/O mapping facility of the IP 32 (typically used by RISC cores to activate peripherals) and to place the required command in the data-bus 46 such that the ACU 31 becomes interrupted and proceeds to decode the command. However, in this case an extra overhead in cycles is added to the protocol, becoming only acceptable if the overall cycle budget is still met.

To reduce the overhead in registers 38 in the cACU's master controller 37, the order in which the data dependency is communicated should be fixed and known at compile time by both cACU and IP schedulers 37, 44. The connection between the individual registers 38 of the cACU 31 and the input of the corresponding application-specific arithmetic units, is fixed at compile time (one register for each input). The assignment of the data dependency to the individual register 38 is decided at compile time (ordered communication of dependencies) and performed at run-time. Data-dependencies that need to be available during more than one consecutive context switch do not need to be communicated and their value is kept alive in the corresponding register.

Figure 16:
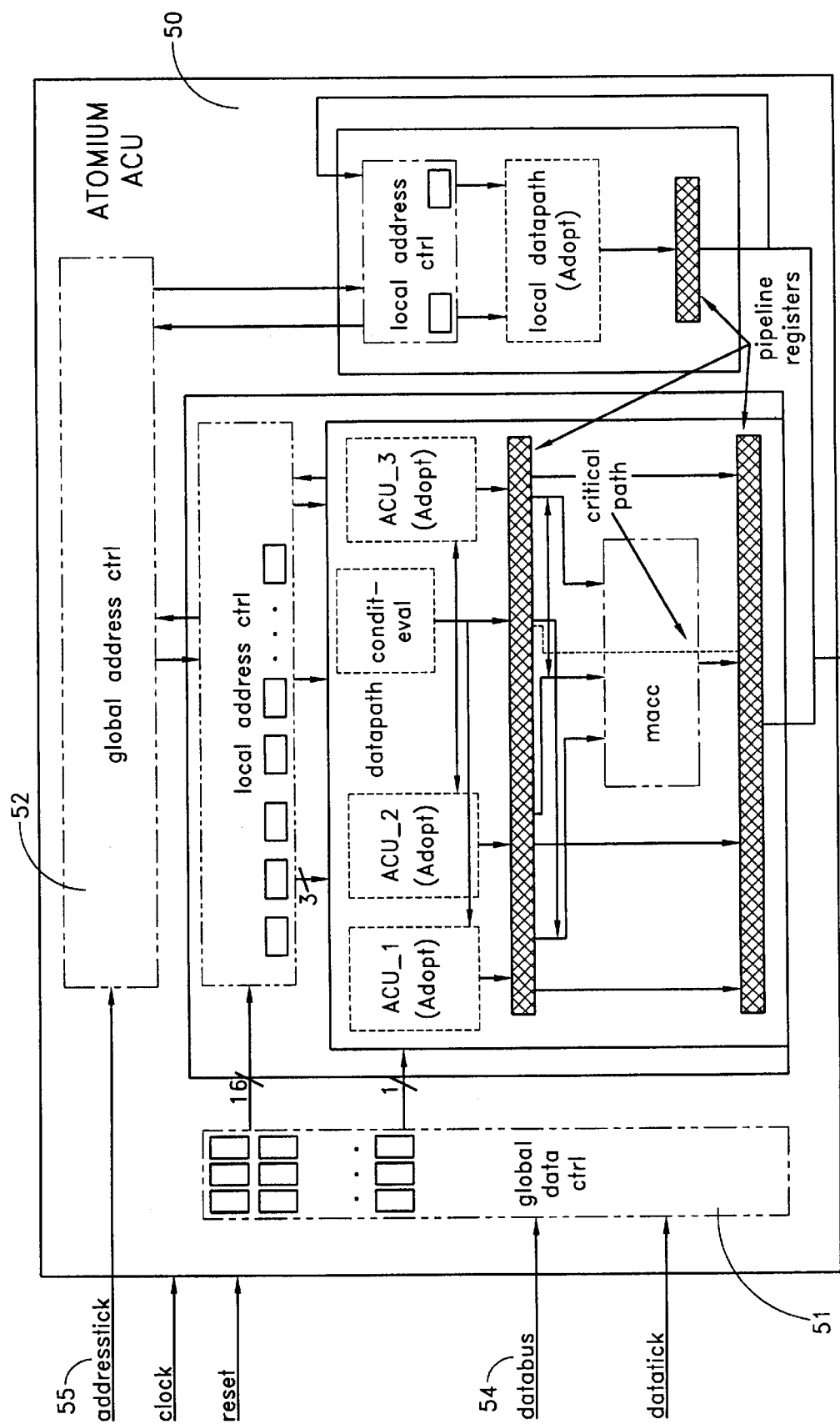
FIG. 16 shows a schematic global view of a pipelined cACU in accordance with an embodiment of the present invention.

In the next embodiment an interface between an ASIP and a cACU 50, is described using the master-slave embodiment (FIG. 16). In the first stage the different addresses expressions have to be extracted from the optimized high level language (e.g. C) specification together with the necessary data-transfers from ASIP to ACU 50. Since the final ordering is not known in this case, the relative ordering of these actions is also extracted from the optimized file, according to the normal procedural execution flow of the code. The memory access and data transfer actions correspond respectively to the function calls/control signals from-ato ( ) and to-ato ( ).

In this ACU 50 two different subtasks can be isolated: the processing of the communicated data and the generation of addresses. The assignment of these two different subtasks to two separate "global" controllers 51, 52 does not create much overhead in terms of extra logic:

a) The communication of the necessary data from ASIP processor to ACU 50 happens independently from the generation of the addresses.

b) Both processes do not have a lot in common in terms of loop structure and FSM-states (no possibilities to share common factors to an important extent).

c) They are both associated to different instruction words of the processor, which makes it feasible to assign different control signals to both of them.

The big advantage of splitting up the controller is that the routing can be more localized and the internal logic can be more globally optimized. Experiments have indeed shown that logic synthesis is very dependent on the size of the entered VHDL specification, resulting in lower cost logic when this partitioning is performed.

Figure 17:
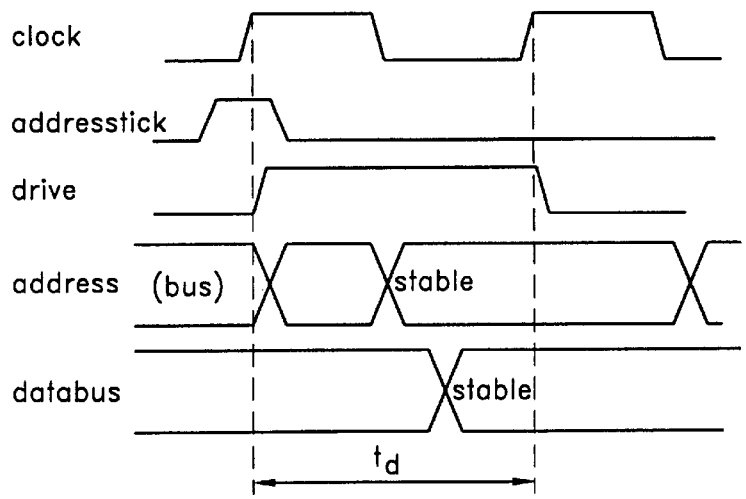
FIG. 17 shows a memory read for an embodiment of the present invention involving a master-slave architecture.
Figure 18:
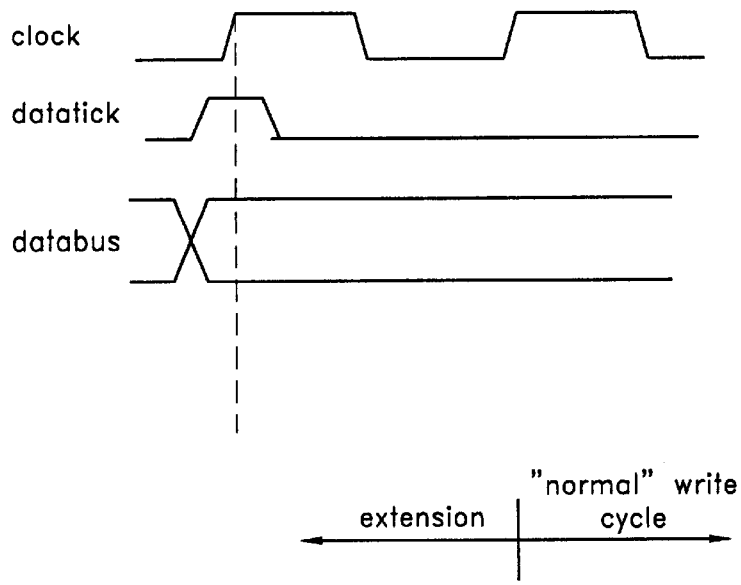
FIG. 18 shows the timing for data input for the embodiment of FIG. 17.
Figure 19:
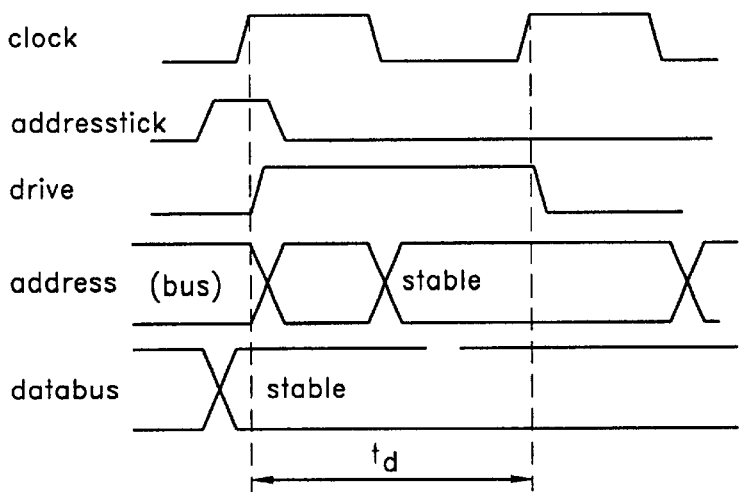
FIG. 19 is a memory write timing for the embodiment of FIG. 17.

FIG. 16 gives a global overview of an ACU 50 and its ports. The inputs are: CLOCK, addresstick, datatick and databus, the only output is address, which represent: CLOCK: the clock of the ASIP. Addresstick: this signals the ACU 50 that an address should be calculated. The cycle before the data of a read or write operation has stabilized, this signal should be raised at the positive clock edge. The start of the calculations is triggered by the raising edge of the CLOCK and a high value of addresstick. The address should be calculated in time td (FIG. 17), after which the address bus is decoupled. This control signal from the ASIP is associated with the special load/store instruction for the from-ato ( ) function calls. Datatick: this signals the ACU that valid data is available on the databus 54. This signal should be raised at the positive clock edge, at that moment data is read (FIG. 18). This control signal is associated with the to-ato ( ) function calls. Databus: the databus 54 is the ASIP datapath. Since the width of the real bus 54 is not known yet, only the relevant width is implemented. Address: the address bus 55 to which the ACU 50 is connected. Since the final width of the bus 55 is also not known, only the most necessary slice is implemented. The connection is assured by tri-state logic, which is steering the bus while the signal DRIVE is high. This signal becomes high at a positive clock edge when addresstick is high, and goes low at a positive clock edge when addresstick is low (FIGS. 17 and 19).

Second Embodiment

Figure 20:
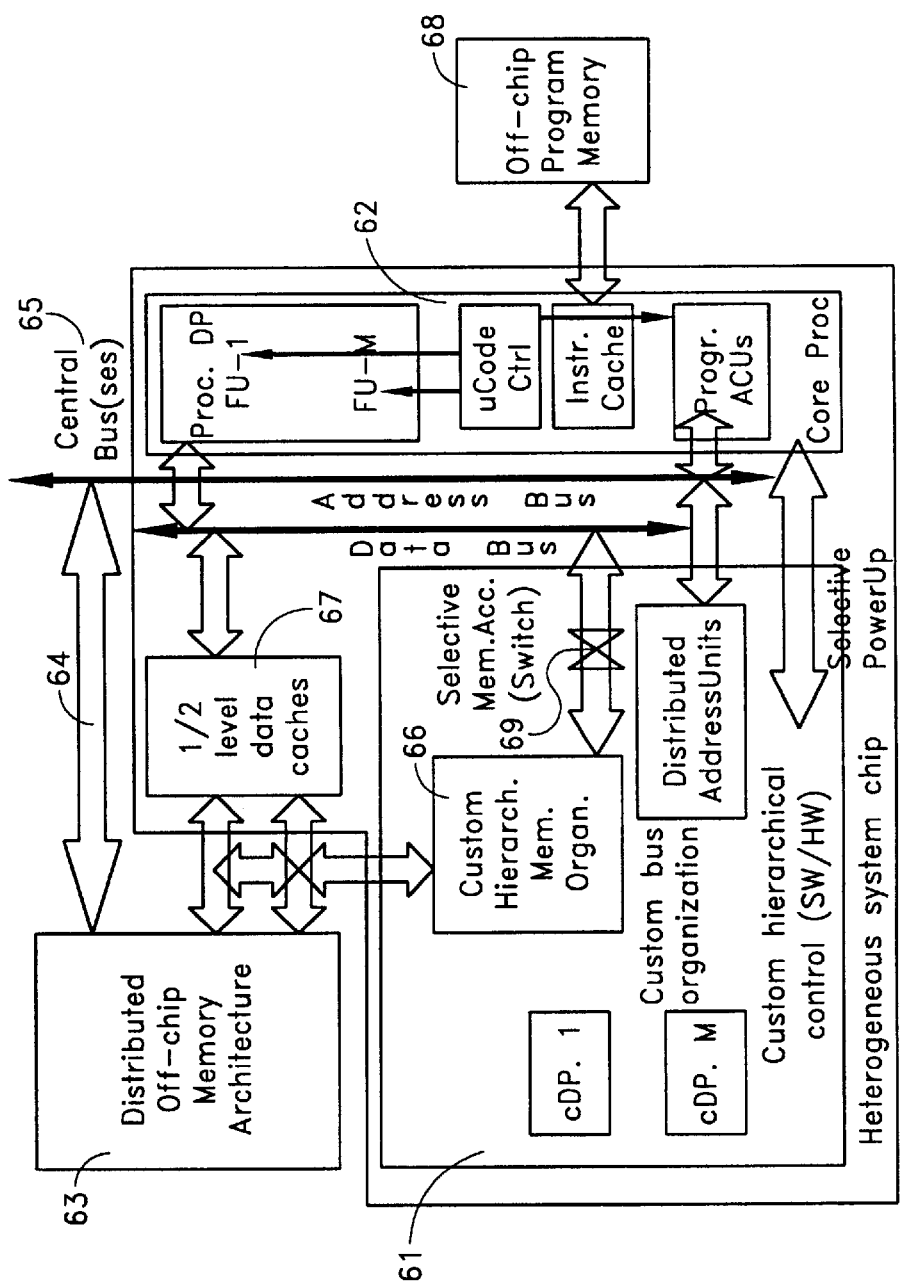
FIG. 20 shows a further architecture for an embodiment of the present invention with HW and SW cores sharing several selected units in the custom memory hierarchy.
Figure 21:
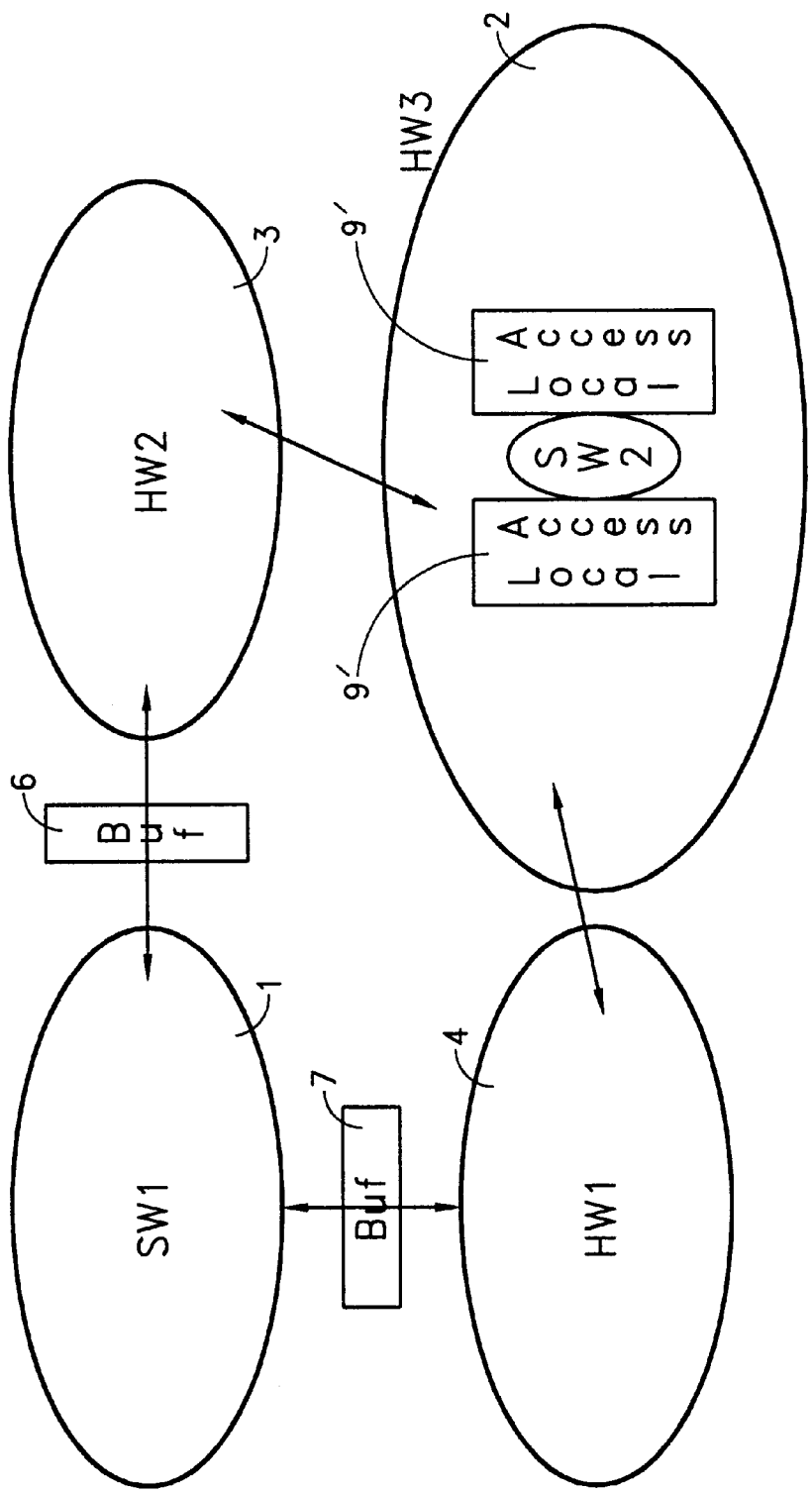
FIG. 21 shows co-operation of SW and HW partitions with several units in the custom memory hierarchy shared in accordance with the embodiment shown in FIG. 20.
Figure 22:
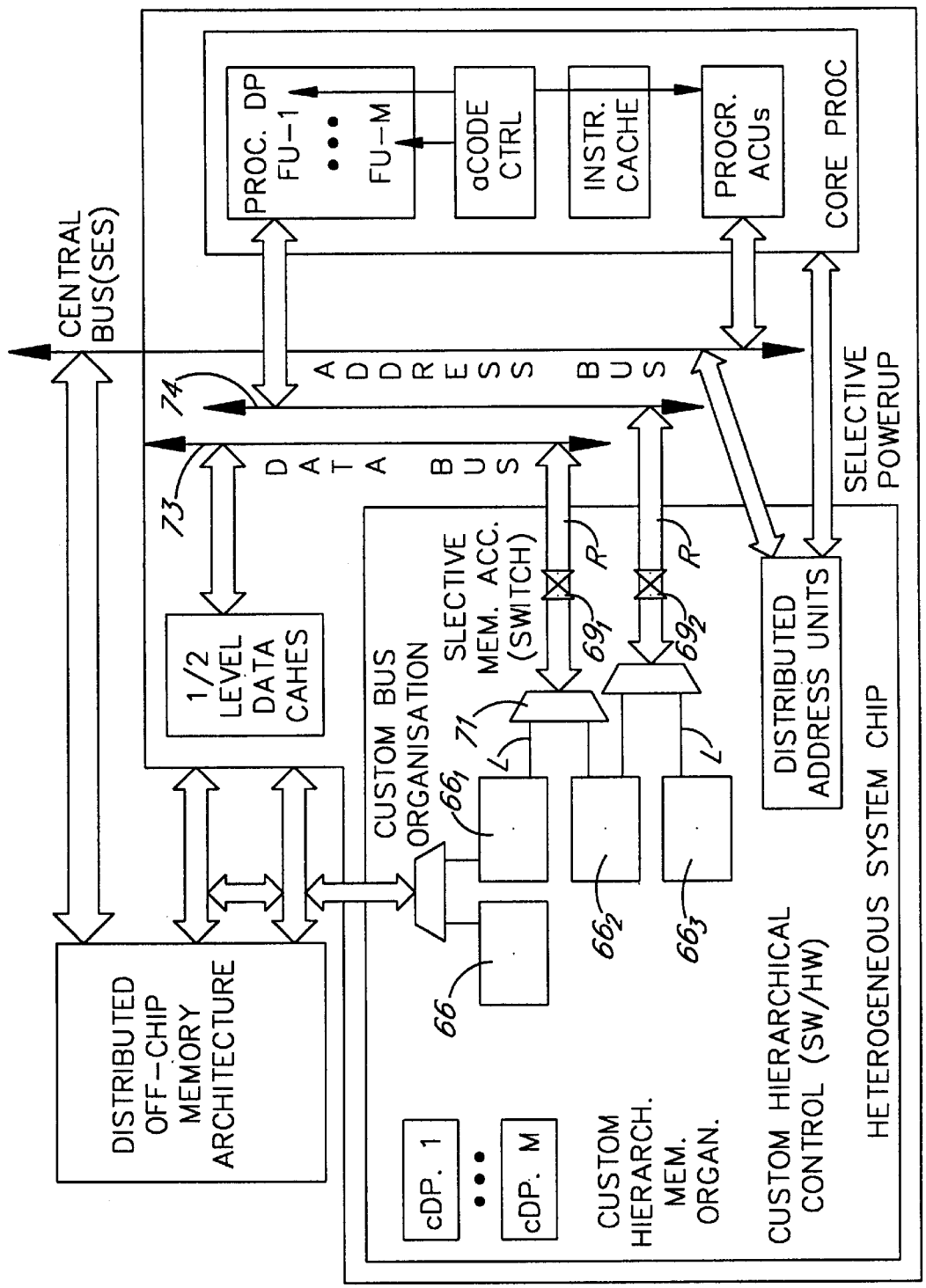
FIG. 22 shows a further modification of the embodiment of FIG. 20 having a power efficient switch tree.
Figure 23:
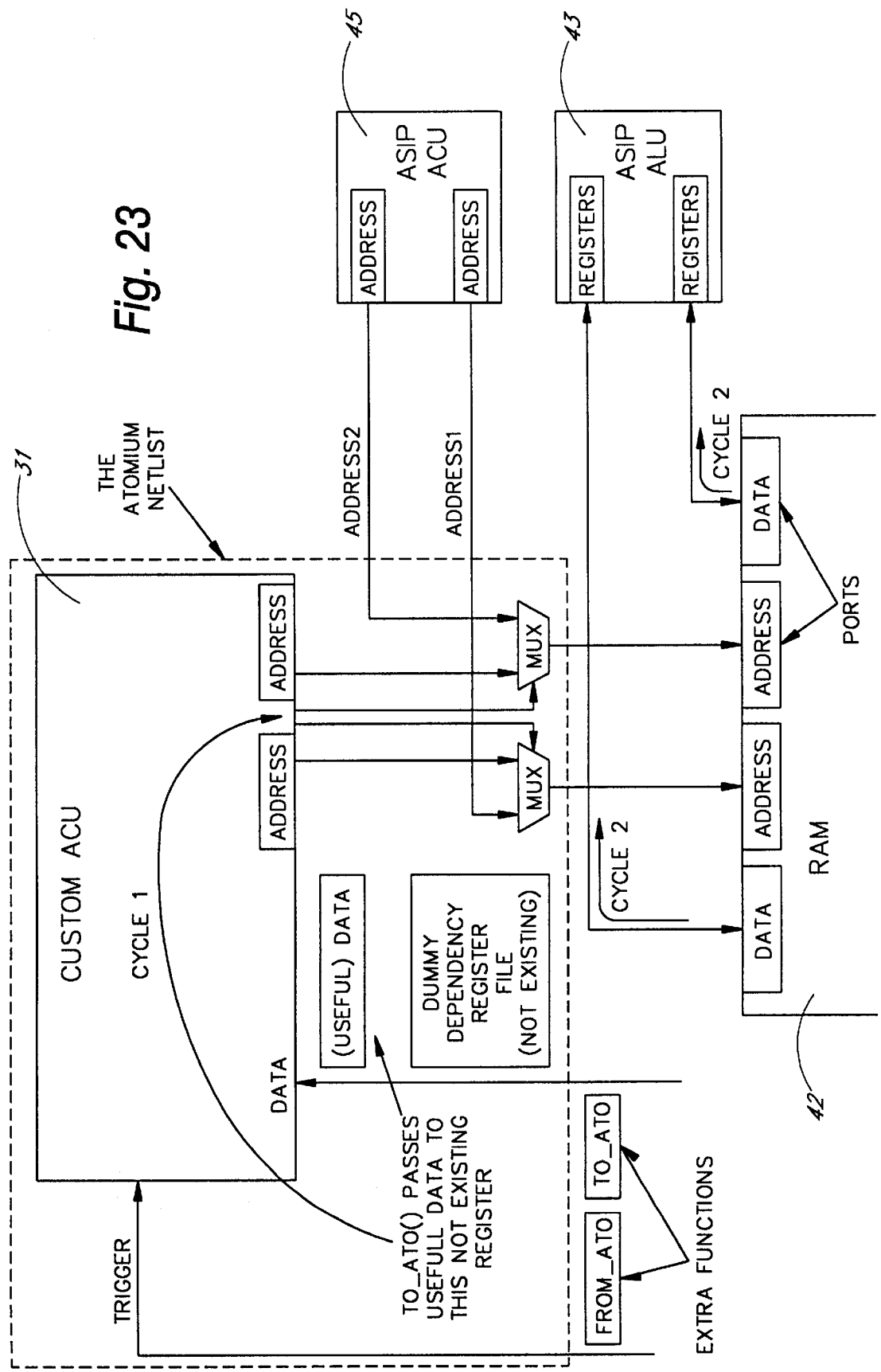
FIG. 23 shows flexible interaction between a custom ACU and programmable ACU in accordance with an embodiment of the present invention.

The first embodiment still has a relatively limited flexibility in the customized points to insert the context switches. This problem can be solved by allowing more impact on the IP architecture. To achieve this, the address space of the IP can be extended to also include a subset of the dedicated memories in the CP. In accordance with a second embodiment of the present invention, the programmable processor is allowed to have access (through a shared address space plus a dedicated switch network) to a subset of the dedicated memories inside the custom hardware organization to obtain more power-efficient flexible processor. One detailed organization of an IP 62 and a customized hardware part 61 is shown in FIG. 20 as an example only. Which memories 66 to select is clearly an important design choice. Again a trade-off is involved between extra overhead to allow the IP 62 to access these memories 66 and reduced overhead in moving code from CP 61 to IP 62. This embodiment allows reduction of the granularity of the boundary (9'-SW2 in FIG. 21) around the modified routines (SW2 processing in FIG. 21) to a very tight context. As a result, moving the modified code from CP 61 to IP 62 involves almost no penalty in power except for the instructions which are modified and cannot be avoided (in contrast to the second embodiment). Note that the access to the data stored in main memory 63 happens best through DMA channels 64 (or equivalent access mode) to bypass the power consuming data caches 67. The power consumption in the dedicated memory organization 66 of the CP 61 is typically at least an order of magnitude lower than what can be achieved in the very flexible memory pipeline of the IP 62. This requires however more changes in the IP instruction set because also special switches 69 have to be controlled, managing the access between the central IP data busses 65 and the selected CP memories 66. Preferably a general N×N cross-bar switch is not used here because of the large power overhead involved in that case. A power-efficient proposal for this is illustrated in FIG. 22 which is part of the CP 61 so it can be fully tuned. One effective solution is to use a multiplexer tree 71, 72 with as many leaves L as there are memory units $66_1$–$66_3$ to be accessed in the custom memory hierarchy 66 of the CP 61 and as many roots R as data busses 73, 74 for the IP 62. In practice, maximally R data have to be provided at the same time so this can be used to simplify the tree further. Moreover, in order to avoid power overhead during the normal CP and IP operation, this tree 71, 72 is decoupled from the IP data busses 73, 74 and the CP memory units 66 by switches $69_1$, $69_2$. These should be located as close as possible to the IP data bus and CP memories to enable cost effective decoupling of the switch network capacitance during normal operation. These switches 69 are selectively powered up only when needed during the interaction protocol. Also the address bus rerouting can be organized in a similar way as the examples of the first embodiment (FIGS. 12 and 15) given above to be flexible and efficient. The architecture allows flexible interaction between the custom ACU 31 and the ACU 45 of the IP as is shown in FIGS. 23 and 16. The performance of the architecture model of the second embodiment can be summarized as:

1. ++: flexibility is feasible where desired at compile-time with small overhead in speed and power compared to a fully custom HW solution. The resulting solution is much more efficient than a conventional solution where all the code would be put in SW to ensure full flexibility. The amount of modifications in the program is obviously limited again by the overhead in the HW-SW context switch and how many (spare) instructions the SW processor core can accommodate. In practice, also here it will seldom be a problem however.
2. ++: power very well optimized wherever a large consumption was present in the initial full SW mapping because almost all of the data-dominated code is running on heavily optimized HW architecture.
3. ++: speed very well optimized because of same reason as power.
4. –: area cost larger than HW solution because also a (small) SW processor core has to be included and because of the extra switch network. Due to the availability of multiple layers of metal however, this switching network overhead should be very reasonable. In principle, the CP can also be viewed as overhead to an already existing IP. The area overhead is then still restricted to the "smaller" memories (the big ones are shared with the normal IP), some data-paths and dedicated control which has been shown in the past to be very area efficient. Moreover, the area of this type of components in a system-on-a-chip context is not expected to be a real issue on deep submicron chips, where transistors are relatively cheap as long as you use them efficiently for power.
5. –: larger design time. Programming of the IP is more difficult (careful synchronization needed and control of "shared" address space with switches); relatively complex trade-offs to make in CP between flexibility and where to put nodes in algorithm with potential cuts or which memories to put in the shared address space. This design time penalty can again be removed largely with the availability of a library of templates to insert in the IP code and with design exploration support to find a good compromise in the CP.

In summary, the second embodiment leads to a very power effective solution which is still fully flexible. It also has definite speed advantages compared to the conventional solution where all "flexible" tasks are mapped on the IP.

Hence, the energy-delay improvement compared to a full SW solution will be very significant (1 to 2 orders of magnitude if well optimized). The only real physical cost is the extra area which can be kept reasonable. The main bottle-neck therefore is the extra design time which has to be spent and which should be reduced by library and tool support to enable a wide-spread use of this approach. For both the first and second embodiments, the processor core data-path(s) can be used to realize any non data-dominated parts which needs to be flexible, compatible with conventional HW-SW co-design methodologies. Central busses and a microcoded controller are used for the arithmetic part just as in the current core-based approaches. Also the fully data-dependent parts (which can only be managed at run-time in terms of data transfer and storage) and the as yet unknown parts at the time of the chip processing have to be still assigned to the SW side. Here run-time hardware control is then responsible for the cache access to the main memories, with a (large) price paid in especially power, even on the state-of-the-art multi-media processors. In order to alleviate also the energy-delay product for these situations, a third embodiment of the present invention will now be described.

Third Embodiment

Figure 24:
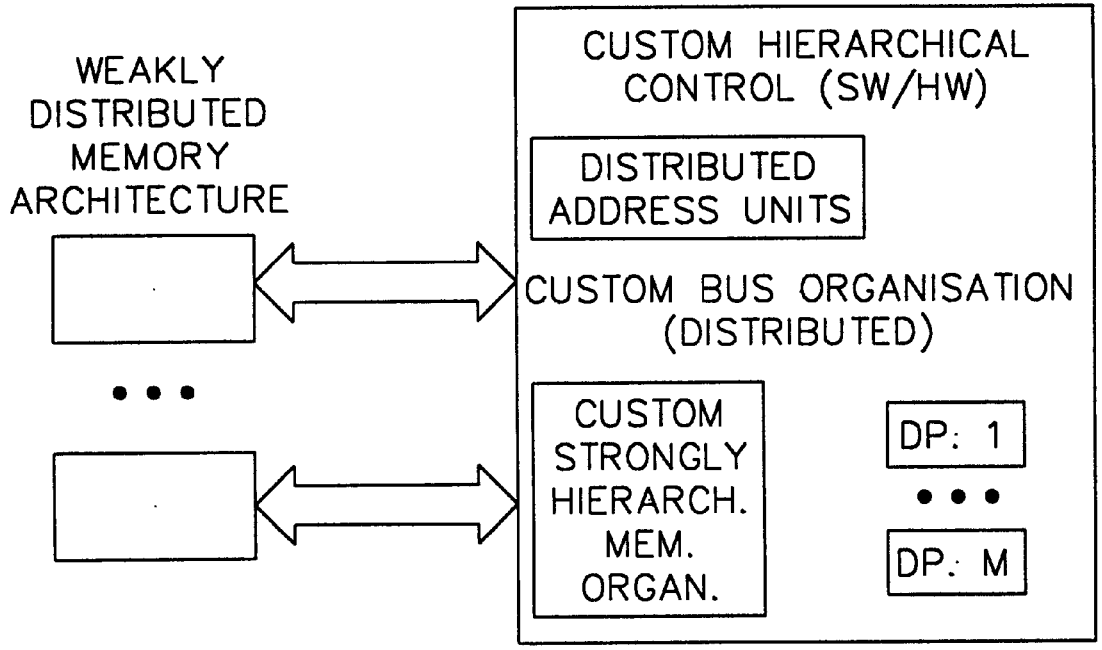
FIG. 24 shows an architecture model: SW/HW for a further embodiment of the present invention.

In a third embodiment of the present invention, more power-efficient fully programmable (parallel) processors are described in which the complete data transfer and storage organization of the programmable processor is modified to be better matched towards the need of a particular multi-media target domain. The latter involves much bigger investments in new SW processor design capabilities and advanced compiler technology. The proposal is to integrate much more domain-specific customization in the data transfer and storage architecture of multi-media processors, as illustrated in FIG. 24. This embodiment of the present invention may be advantageously used with a customized processor. For instance, the IP architecture shown schematically in FIG. 24 may be advantageously combined with custom processor 21 as shown in FIG. 6 to replace the IP 22. Individual aspects of this customization include:

1) Adding flexible bypasses not only over a single cache level but over any combination of cache levels. This allows to avoid costly copying whenever this is unnecessary for a particular signal in the multi-media application.
2) Allowing signals to reside "permanently" in one of the intermediate cache levels instead of in the main memory only. This is different (much more flexible) than using e.g. an on-chip prefetch buffer as advocated in a number of recent processors like the MIPS RISC. It allows to keep medium-size signals in more power-effective smaller memories than in the main memory, even when they are accessed only infrequently throughout the program.
3) Allowing different cache levels to be merged in a single memory (with different internal banks) in such a way that the size of each level is totally flexible, as long as the sum is below a specific maximum. This means that cache sizes and even the number of levels available for the programmer can be totally adapted to the application being mapped.
4) Allowing flexible line sizes by having the cache partitioned into different banks which are then put together into the "physically addressed" cache for a particular block of the algorithm. The unused banks are simply powered down or with somewhat more hardware overhead, they can even be assigned temporarily to another cache level for that algorithm block. This scheme can also be extended to change the clustering of banks (and hence the line size) for every signal individually.
5) Allowing change of the degree of associativity (within a given subrange) for a particular cache level. Ideally also the direct mapped case should be available. Experiments have indeed shown that the power for a particular routine in the application does depend heavily on the associativity degree. So this associativity should be varied for different routines.
6) Varying the number of parallel paths between the main memory and the processors by a partly customized, partly controllable routing network. This network can be for instance realized in a similar power-efficient way as the switch network 71, 72 of FIG. 22 of the third embodiment.
7) Allowing a combination of programmable (instruction-set based) ACUs and heavily customized ACUs (see variant of second embodiment) to speed up the address generation for more complex address expressions. This is useful both for the cache levels and for steering the off-chip main memory.

The implementation of the third embodiment comes partly at the price of reduced flexibility compared to general-purpose RISCs but especially needs a heavy investment in new processor architecture design and compiler technology. The potential savings will be even larger than in the previously described embodiments, however. Recently, some companies have been proposing very domain-specific processors for a limited class of applications. An example is the programmable MIPS MPEG2 engine. These processors still have a limited scope and the data transfer and storage bottle-neck have not been really solved, especially in terms of power. The performance of the architecture model of the third embodiment can be summarized as:

1. ++(+): flexibility is feasible even if no idea is present at compile-time of which is the exact arithmetic/logic/local control part of the algorithm behavior to be executed. It suffices to know which types of complex data structures are present and which are the dependencies between these in the expected algorithms. Based on this the customization the memory units and the interconnection network has to be determined.
2. ++(+): power is heavily optimized wherever large consumptions take place, i.e. for the main data transfers in the algorithm on the main storage and communication resources. Of course, this will happen only if enough customization in the data transfer and storage architecture is feasible towards the actually executed algorithms.
3. −: extra area due to customization of memory and communication hierarchy and its control.
4. ++(+): speed is (much) better than the current multi-media processor, especially regarding storage/transfers. This is again true only if enough customization is feasible towards the actually executed algorithms.
5. −−−: much larger design time. Programming very difficult (e.g. complex MMU, control, interfaces) and design exploration support may be required to find an acceptable architecture solution. In this case the existing DTSE methodology is clearly insufficient to support this heavily programmable architecture definition. It can at most be used as a partial basis for building a multi-media precompiler which takes care of mapping the data-dominated modules on the new processor architecture. Finally, much more extensive compile-time analysis than currently available in literature, is needed for the entire application code including the data-dependent cases.

Fourth Embodiment

Figure 25:
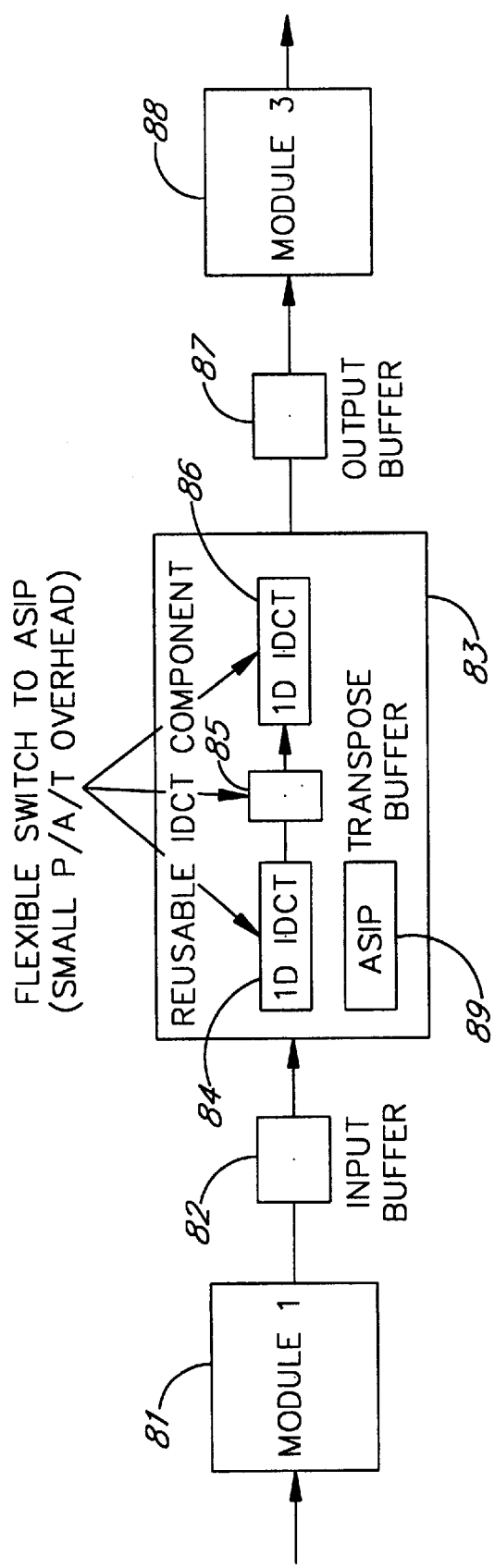
FIG. 25 shows an example of an implementation with an ASIP in accordance with an embodiment of the present invention.

In accordance with a fourth embodiment of the present invention "reuse" in the design process is linked to the concepts of the above embodiments. In accordance with an aspect of this embodiment flexible HW-SW mix approaches are advocated which allow a different way of looking at "component design reuse" (in an intellectual property block context), which is much more malleable than the reuse of a predefined fully fixed component. A big hardware block (CP) which was in the past unmodifiable can now be accompanied by a small IP or an IP which supports the modifications discussed above with respect to the first to third embodiments. Both can then cooperate as discussed with respect to the first and second embodiments in order to make it fit better into the desired context. In the conventional approach such a CP block has to fit "perfectly" which reduces the chances of reuse: Alternatively, reuse is linked with a mismatch between modules which has to be absorbed by buffers between the modules which must reprocess the data into a form suitable for the next module. This creates quite a large overhead in the context of the CP (e.g. system buffers). In the present embodiment, the CP can be flexibly adapted without too much overhead so that it molds perfectly into its environment. Even some small internal modifications can be made to it if its functional behavior should be updated due to modified standards or bug fixes. For example, an Inverse Discrete Cosine Transform (IDCT) is preferably expressed as two 1-D IDCT blocks 84, 86 which each process a set of scalar data to combine into one output scalar (FIG. 25). Assume that the input buffer 82 converts from vertical (V) to horizontal (H) block format and that the output buffer 87 converts from V to H. The cost of these buffers is typically quite large and experiments have indicated, for example, that the power consumed by one ID IDCT data-path and control module is about the same as the transpose buffer 85. If the 2D IDCT module 83 is accompanied by an IP 89 in accordance with the present invention, the saturation arithmetic for the accumulation of the partial row or column results for a particular set of rows or columns (e.g. the final ones) can be modified even after the reusable block has been designed and implemented. The input and output buffers 82, 87 can be removed by merging them with the transpose buffer 85 by making the appropriate changes in the local code accessing the transpose buffer 85. This may require several context switches between IP 89 and CP 83 but the end result is worth it. In a conventional reuse strategy, the addressing of the streams would be integrated in the VHDL code for the 1D IDCT modules 84, 86 and a complete redesign would be required to avoid the buffering.

Although the specific embodiments have been described with respect to particular applications and architectures, modifications and changes of the illustrated embodiments lie within the scope of the invention. No limitations to the scope of the present invention are intended by the illustrated examples and the present invention is only to be limited by the scope of the appended claims.

What we claim is:

1. A programmable processing engine, the processing engine including a customized processor, a flexible processor and a data store commonly sharable between the two processors, the customized processor normally executing a sequence of a plurality of pre-customized routines the programmable processing engine, comprising:

a controller for monitoring the customized processor during execution of a first code portion to select one of a set of pre-customized processing interruption points in a first routine and for switching context from the customized processor to the flexible processor at the interruption point.

2. The processing engine of claim 1, wherein the data store is at least a part of the local data storage of the customized processor.

3. The processing engine of claim 1, wherein the data store is data storage shared commonly by both the customized and the programmable processor.

4. The processing engine of claim 1, wherein the customized processor is a custom address calculation unit.

5. The processing engine of claim 1, wherein the programmable processor is an application specific instruction set processor.

6. The processing engine of claim 1, wherein the customized processor is a memory management unit.

7. The processing engine of claim 1, wherein the programmable processor includes a counter means for determining the timing of the context switch.

8. The processing engine of claim 1, wherein the customized processor is adapted supply information to the programmable processor sufficient to determine the timing of the context switch.

9. The processing engine of claim 8, wherein the programmable processor is adapted to monitor the branch evolution in the customized processor.

10. The processing engine of claim 8, wherein the programmable processor has a register and the customized processor is adapted to transmit information relating to the status of routines running on the custom processor for storage in said registers.

11. The processing engine of claim 1, wherein the flexible processor comprises a hierarchy of cache memories, the cache memories being flexibly configurable at run time.

12. The processing engine of claim 11, wherein the flexibly configurable cache memories include flexible bypasses over a selectable combination of cache levels of the hierarchy.

13. The processing engine of claim 11, wherein the flexibly configurable cache memories include means for allowing signals to reside in a selectable one of the cache levels of the hierarchy for more than one cycle.

14. The processing engine of claim 11, wherein the flexibly configurable cache memories include means for allowing different cache levels of the cache memory hierarchy to be merged in a single memory such that the size of each cache level is selectable therefrom.

15. The processing engine of claim 11, wherein the flexibly configurable cache memories include means for dividing the cache into banks and means for selectably combining the banks into selectably accessible cache partitions.

16. The processing engine of claim 11, wherein the flexibly configurable cache memories include means for allowing selection of the degree of associativity for any cache level.

17. The processing engine of claim 1, wherein access of the flexible processor to the sharable data store is provide by a switching network.

18. The processing engine of claim 17, wherein the switching network is adapted so that it only provides access to the data store at the context switch and outside the context switch the flexible and/or the customized processor is not loaded capacitively by the access connections.

19. A method of operating a programmable processing engine, the processing engine including a customized processor, a flexible processor and a data store commonly sharable between the two processors, the customized processor normally executing a sequence of a plurality of pre-customized routines the method, comprising:

monitoring the customized processor during execution of a first code portion to select one of a set of pre-customized processing interruption points in the first routine; and switching context from the customized processor to the flexible processor at the interruption point.

20. The method of claim 19, additionally comprising:

executing a second code portion on said flexible processor using at least part of first data left in the data store by the execution of the first code portion on the customized processor.

21. The method according to claim 20, additionally comprising:

completing the execution of the second code portion on the flexible processor such that second data is left in the data store; and switching context to the customized processor and continuing processing of a third code portion on the customized processor using at least a part of the second data.

22. The method of claim 21, wherein the flexible processor instructs the customized processor to skip a certain number of processing steps before the customized processor begins processing of the second data.

23. The method of claim 19, wherein the customized processor is powered down after the context switch to the flexible processor.

24. The method of claim 19, wherein the data store is at least a portion of the local data storage of the customized processor.

25. The method of claim 19, wherein the data store is data storage shared commonly by both the customized and the programmable processor.

26. A customized processor comprising a controller for monitoring the execution of a process running on the customized processor and being adapted to select one of a set of pre-customized processing interruption points in the process and for halting the customized processor at any one of the interruption points.

27. The customized processor of claim 26, wherein the customized processor is a custom address calculation unit.

28. The customized processor of claim 26, wherein the customized processor is a memory management unit.

29. The customized processor of claim 26, wherein the customized processor is adapted to output information sufficient to determine the timing of the context switch.

30. The customised processor according to claim 26, additionally comprising at least one switch for selectably allowing access to a part of the data storage local to the customized processor.

* * * * *